US008966441B2

(12) United States Patent
Cohanoff

(10) Patent No.: US 8,966,441 B2
(45) Date of Patent: Feb. 24, 2015

(54) DYNAMIC SCRIPTS TO EXTEND STATIC APPLICATIONS

(75) Inventor: David Cohanoff, Beverly Hills, CA (US)

(73) Assignee: Oracle International Corporation, Redwood Shores, CA (US)

(*) Notice: Subject to any disclaimer, the term of this patent is extended or adjusted under 35 U.S.C. 154(b) by 49 days.

(21) Appl. No.: 13/547,641

(22) Filed: Jul. 12, 2012

(65) Prior Publication Data

US 2014/0019936 A1  Jan. 16, 2014

(51) Int. Cl.
*G06F 9/44* (2006.01)

(52) U.S. Cl.
USPC ........... 717/115; 717/128; 717/140; 717/141; 717/142; 717/143; 717/174

(58) Field of Classification Search
None
See application file for complete search history.

(56) References Cited

U.S. PATENT DOCUMENTS

| | | | | |
|---|---|---|---|---|
| 6,091,895 A * | 7/2000 | Govindaraj | ................... | 717/114 |
| 6,353,923 B1 * | 3/2002 | Bogle et al. | ................... | 717/128 |
| 6,434,740 B1 * | 8/2002 | Monday et al. | ............... | 717/108 |
| 6,542,908 B1 * | 4/2003 | Ims | .................................... | 1/1 |
| 6,634,022 B1 * | 10/2003 | Leermakers | ................... | 717/158 |
| 6,668,369 B1 * | 12/2003 | Krebs et al. | ................... | 717/125 |
| 6,850,922 B1 | 2/2005 | Wason | | |
| 7,194,664 B1 * | 3/2007 | Fung et al. | ........................ | 714/45 |
| 7,590,973 B1 * | 9/2009 | Barry et al. | ................... | 717/126 |
| 7,665,068 B2 * | 2/2010 | Neumann et al. | ............. | 717/125 |
| 7,774,746 B2 * | 8/2010 | Mansfield et al. | ............ | 717/106 |
| 7,926,063 B2 * | 4/2011 | Afshar et al. | ................. | 719/310 |
| 7,934,207 B2 * | 4/2011 | Gustafsson et al. | .......... | 717/143 |
| 7,996,765 B1 * | 8/2011 | Mitnick et al. | ................ | 715/235 |
| 8,046,736 B1 * | 10/2011 | Freeman et al. | .............. | 717/108 |
| 8,260,793 B2 * | 9/2012 | Kiraly et al. | ................... | 707/756 |
| 8,432,403 B2 * | 4/2013 | Kota et al. | ..................... | 345/502 |
| 8,432,404 B2 * | 4/2013 | Kota et al. | ..................... | 345/502 |
| 8,441,488 B2 * | 5/2013 | Kota et al. | ..................... | 345/502 |
| 8,799,901 B2 * | 8/2014 | Kuno et al. | .................... | 718/100 |

(Continued)

FOREIGN PATENT DOCUMENTS

WO   WO0120530   3/2001

OTHER PUBLICATIONS

Hallmark, G. "Smart Business Processes using Oracle Business Rules", published Dec. 2008, 16 pages.

(Continued)

*Primary Examiner* — Don Wong
*Assistant Examiner* — Roberto E Luna
(74) *Attorney, Agent, or Firm* — Omkar K. Suryadevara; Silicon Valley Patent Group LLP

(57) ABSTRACT

One or more processors receive (a) first software written in a first computer language, (b) user input identifying a first name of a first method in a plurality of methods defined in the first software, and (c) user input identifying a location within a second software that is written in a second computer language different from the first computer language. In response, the one or more processors automatically prepare and store at the user-identified location in the second software, a new instruction formatted in a syntax of the second computer language that invokes the first method identified in the first software by the first name. The second software may be initially created with a first instruction to include at least a first additional name (e.g. "main") used to invoke execution of the second software, and as a parameter thereof a second additional name identifying the first software.

23 Claims, 43 Drawing Sheets

(56) References Cited

U.S. PATENT DOCUMENTS

| | | | |
|---|---|---|---|
| 2005/0060693 A1* | 3/2005 | Robison et al. | 717/143 |
| 2005/0132333 A1* | 6/2005 | Neumann et al. | 717/124 |
| 2005/0144596 A1* | 6/2005 | McCullough et al. | 717/136 |
| 2005/0261920 A1* | 11/2005 | Kuno et al. | 705/1 |
| 2005/0289536 A1* | 12/2005 | Nayak et al. | 717/174 |
| 2006/0136880 A1* | 6/2006 | Sone et al. | 717/136 |
| 2007/0055943 A1* | 3/2007 | McCormack et al. | 715/746 |
| 2007/0094199 A1 | 4/2007 | Deshpande et al. | |
| 2007/0300211 A1* | 12/2007 | Reinhold | 717/140 |
| 2008/0086502 A1 | 4/2008 | Kohlscheen et al. | |
| 2008/0120596 A1* | 5/2008 | Kothari et al. | 717/113 |
| 2008/0189689 A1* | 8/2008 | Tramontana et al. | 717/143 |
| 2008/0209391 A1* | 8/2008 | Iborra et al. | 717/105 |
| 2008/0222543 A1* | 9/2008 | Naono et al. | 715/764 |
| 2008/0222627 A1 | 9/2008 | Kaplan et al. | |
| 2009/0064091 A1* | 3/2009 | Tonkin et al. | 717/104 |
| 2009/0113387 A1 | 4/2009 | Ziegler | |
| 2009/0300472 A1* | 12/2009 | Ambrosino et al. | 715/201 |
| 2010/0030604 A1 | 2/2010 | Cummins | |
| 2010/0198634 A1 | 8/2010 | Hayden et al. | |
| 2011/0035729 A1* | 2/2011 | Sakhare et al. | 717/120 |
| 2011/0131556 A1* | 6/2011 | Tatsubori | 717/137 |
| 2011/0145795 A1* | 6/2011 | Khanapurkar et al. | 717/126 |
| 2011/0265071 A1* | 10/2011 | He | 717/168 |
| 2012/0047485 A1* | 2/2012 | Lanque et al. | 717/105 |
| 2012/0102483 A1* | 4/2012 | Goldman | 717/174 |
| 2013/0061212 A1* | 3/2013 | Krause et al. | 717/128 |
| 2013/0125094 A1* | 5/2013 | Wolfram et al. | 717/109 |
| 2013/0159960 A1* | 6/2013 | Sivaramakrishnan et al. | 717/100 |
| 2013/0205277 A1* | 8/2013 | Seven et al. | 717/121 |

OTHER PUBLICATIONS

"Fast Formula", in Oracle Human Resource Management System (HRMS), as described in a book "Oracle FastFormula User's Guide", Release 11.0, Part. No. A58346-01, published 1995, 105 pages.

Grogan, M. "Specification: JSR-223, Scripting for the Java Platform Specification", released Jul. 31, 2006, 140 pages.

JBoss Enterprise BRMS, Open Source Business Rules Management System Enables Active Decisions, printed from http://www.jboss.com/pdf/JBossBRMSFactSheetWebPDF.pdf, 2010, 7 pages.

Seemanthini R., BRF: Business Rule Framework, printed from http://www.sdn.sap.com/irj/scn/go/portal/prtroot/docs/library/uuid/30965164-efea-2b10-b7a7-f162d1688b78?QuickLink=index&overridelayout=true, 2009, 28 pages.

"Enhancing game engine with scripting capabilities", printed from http://www.java-gaming.org/index.php?topic=23869.0 , Apr. 2011, 5 pages.

Groovy—an agile dynamic language for the Java platform, printed from http://groovy.codehaus.org/JSR+223+Scripting+with+Groovy , Apr. 2011, 4 pages.

"IBM—What is a BRMS?", printed out from http://www-01.ibm.com/software/websphere/products/business-rule-management/whatis/ , Apr. 2011, 3 pages.

FICO™ Blaze Advisor® business rules management, printed from http://www.fico.com/en/Products/DMTools/Pages/FICO-Blaze-Advisor-System.aspx , Apr. 2011, 4 pages.

Keeley, P. "Fast Formula, the Key to Simplifying Your User's Life", OAUG Spring 2002, 38 pages.

Javax script, How to call a Function in JavaScript from Java, printed from http://stackoverflow.com/questions/2710334/javax-script-how-to-call-a-function-in-javascript-from-java Apr. 2010, 2 pages.

Java Scripting Programmer's Guide, printed from http://docs.oracle.com/javase/6/docs/technotes/guides/scripting/programmer_guide/index.html, believed to be published prior to Apr. 2012, 7 pages.

McQueeney, T. "Invoke dynamic languages dynamically, Part 1: Introducing the Java scripting API", IBM developerWorks, printed from www.ibm.com/developerworks/java/library/j-javascripting1/, Sep. 2007, 7 pages.

McQueeney, T. "Invoke dynamic languages dynamically, Part 2: Find, execute, and change scripts at run time", IBM developerWorks, printed from www.ibm.com/developerworks/java/library/j-javascripting2/, Sep. 2007, 11 pages.

Oracle® Fusion Middleware, User's Guide for Oracle Business Rules, 11 g Release 1 (11.1.1), E10228-01, May 2009, 332 pages.

Package javax.script (Java Platform SE 6), printed from http://docs.oracle.com/javase/6/docs/api/javax/script/package-summary.html, believed to be published prior to 2011, 3 pages.

Interface ScriptEngine (Java Platform SE 6), printed from http://docs.oracle.com/javase/6/docs/api/javax/script/ScriptEngine.html, believed to be published prior to 2011, 9 pages.

Interface Invocable (Java Platform SE 6), printed from http://docs.oracle.com/javase/6/docs/api/javax/script/Invocable.html, believed to be published prior to 2011, 3 pages.

Class ScriptEngineManager (Java Platform SE 6), printed from http://docs.oracle.com/javase/6/docs/api/javax/script/ScriptEngineManager.html, believed to be published prior to 2011, 6 pages.

Package javax.tools (Java Platform SE 6), printed from http://docs.oracle.com/javase/6/docs/api/javax/tools/package-summary.html, believed to be published prior to 2011, 3 pages.

Pawlan M. "JRuby and the Java Platform", printed from http://java.sun.com/developer/technicalArticles/scripting/jruby/, believed to be published in Jun. 2007, 8 pages.

Roth G. Scripting on the Java Platform, Using Groovy, Jython, and JRuby for Java development, printed from http://javaworld.com/javaworld/jw-11-2007/jw-11-jsr223.html, Nov. 2007, 7 pages.

McCluskey G. "Using Java Reflection", printed from http://www.oracle.com/technetwork/articles/java/javareflection-1536171.html?printonly, Jan. 1998, 5 pages.

* cited by examiner

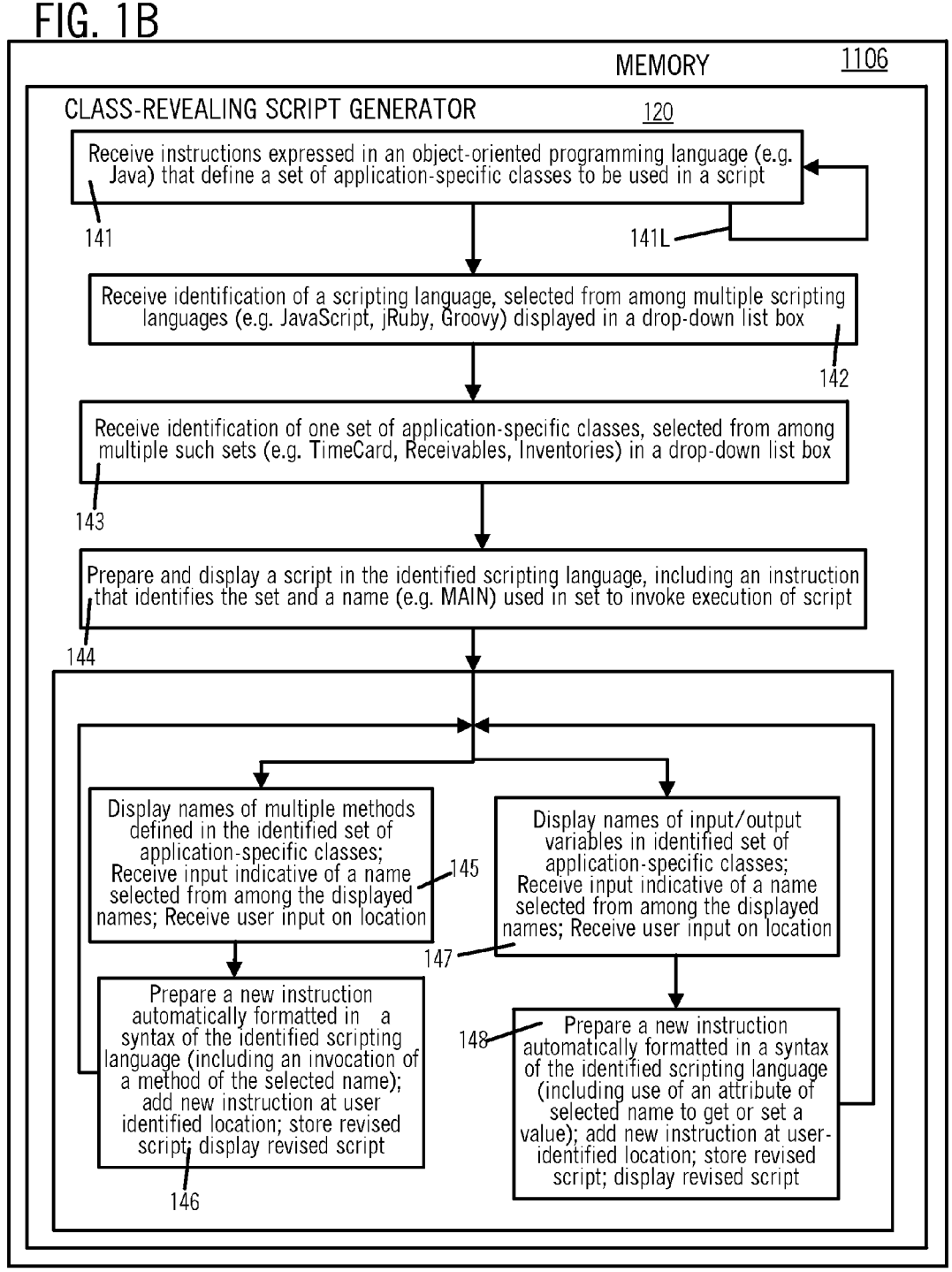

FIG. 2B1
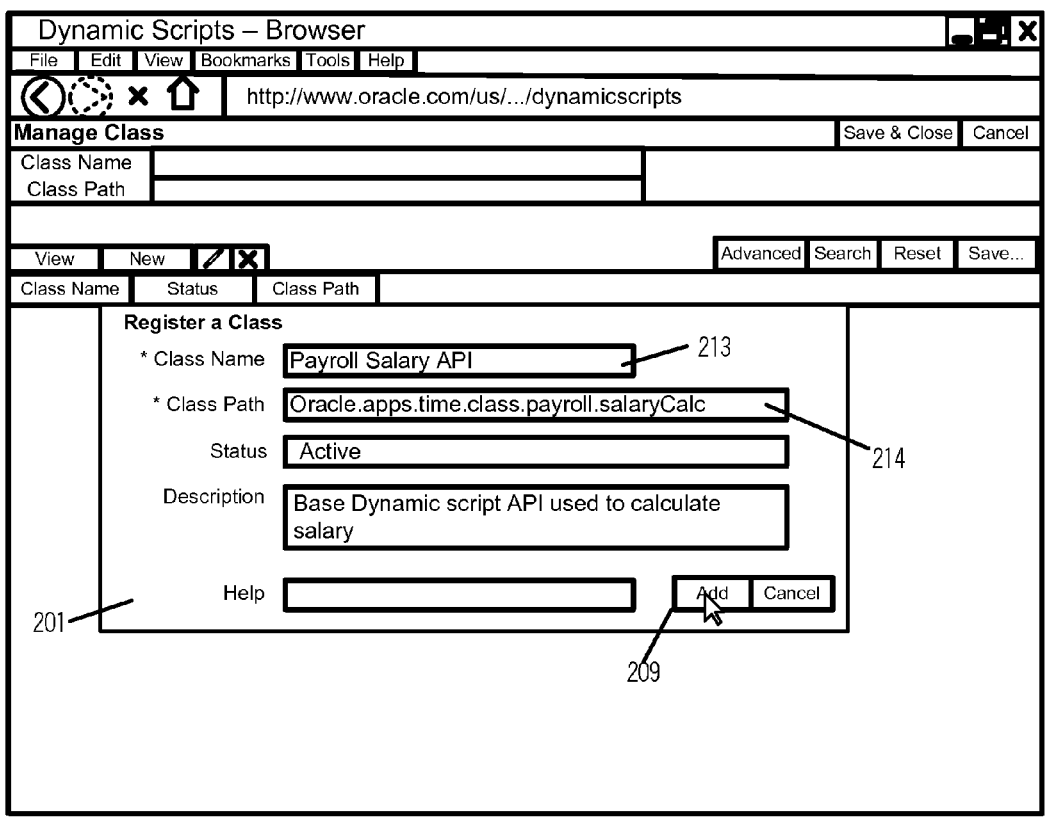

299

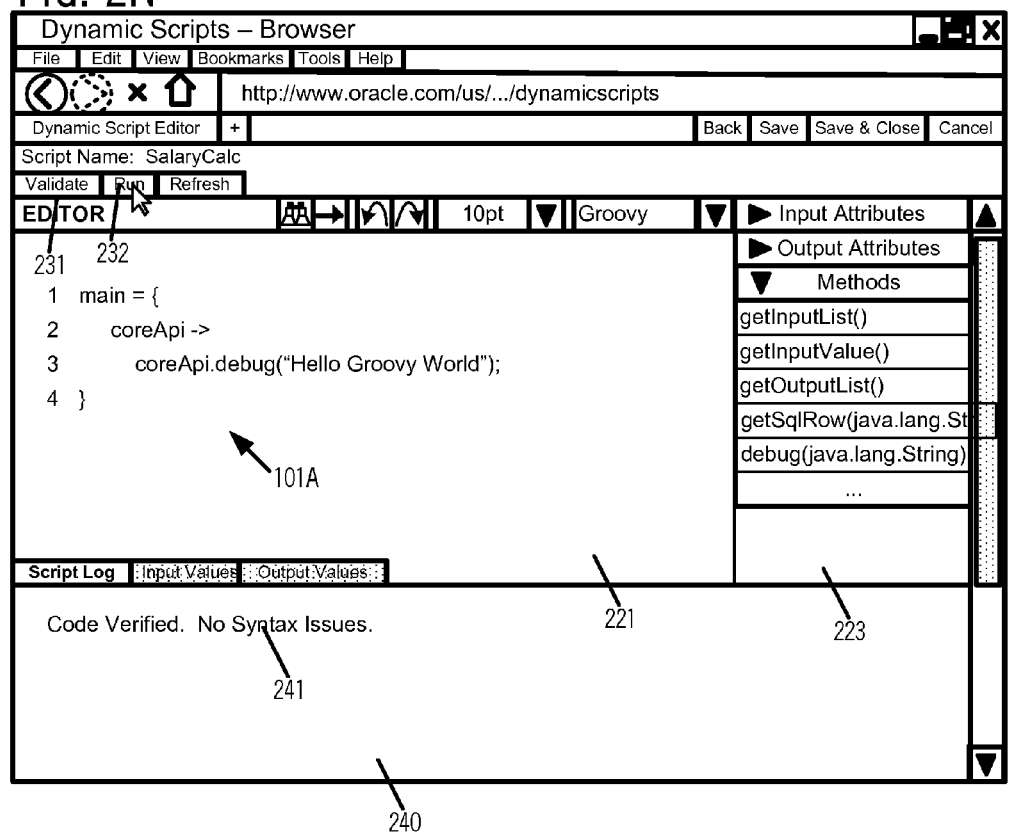

FIG. 2Q

```
Dynamic Scripts – Browser                                    _ ☐ X
File  Edit  View  Bookmarks  Tools  Help
⊙ ⟳ ✕ ⌂   http://www.oracle.com/us/.../dynamicscripts
Dynamic Script Editor  +                         Back  Save  Save & Close  Cancel
Script Name: SalaryCalc
Validate  Run  Refresh
EDITOR                   🔠→↶↷  10pt ▼ Groovy  ▼  ▶ Input Attributes     ▲
                                                  ▶ Output Attributes
                                                  ▼     Methods
  1  main = {                                     getInputList()
  2      coreApi ->                               getInputValue()
  3          coreApi.debug("Hello Groovy World")  v;  getOutputList()
  4  }                                            getSqlRow(java.lang.St
                                                  debug(java.lang.String)
               ↖ 101A                                      ...

Script Log | Input Values | Output Values
0: INFO -  Hello Groovy World        ↙ 242
1: EXCEPTION -  Script Exception
2: EXCEPTION -  org.codehaus.groovy.runtime.InvokerInvocationException:
groovy.lang.MissingPropertyException: No such property: v for class: Script
                                                                       ▼
                        ↘
                        240
```

FIG. 2R

```
Dynamic Scripts – Browser                                    _ - X
File | Edit | View | Bookmarks | Tools | Help
(<) (○) X (⌂)   http://www.oracle.com/us/.../dynamicscripts
Dynamic Script Editor  | + |                   Back | Save | Save & Close | Cancel
Script Name: SalaryCalc
| Validate | Run | Refresh |
EDITOR              [🔍]→|∧|∧|  8pt  ▼ Groovy  ▼   ▶ Input Attributes    ▲
                                                  ▶ Output Attributes
 1  main = {                                      ▶ Methods
 2    coreApi ->
 3      def sqltxt = " select TABLE_NAME  from SYS.ALL_TABLES where table_name like 'FND_LA%'
        order by 1 ";
                                                                         251
 4
 5  }
                      ↖
                        101A Script Log | Input Values | Output Values |
                                                                          ▼
```

FIG. 2S

```
Dynamic Scripts – Browser                                          _ □ X
 File | Edit | View | Bookmarks | Tools | Help |
  ◀ ◌ ✕ ⌂    http://www.oracle.com/us/.../dynamicscripts
 Dynamic Script Editor | + |                    Back | Save | Save & Close | Cancel
 Script Name: SalaryCalc
 Validate | Run | Refresh |
 EDITOR              🗚→|⤴⤵|  8pt  ▼|Groovy  ▼| ▶ Input Attributes           ▲
                                                ▶ Output Attributes
  1  main = {                                   ▼    Methods
  2      coreApi ->                             getInputList()
  3         def sqltxt = " select TABLE_NAME  from SYS.ALL_TABLES
              where table_name like 'FND_LA%' order by 1 ";   getInputValue()
  4         def rs = I                          getOutputList()
  5  }                              251         getSqlRow(java.lang.S   ← 226J
                  252                           debug(java.lang.String)
                         ↖ 101A                 ...

Script Log | Input Values | Output Values |
                                                                       223
                                                                        ▼
```

FIG. 2X

```
Dynamic Scripts – Browser                                    _ ☐ X
 File   Edit   View   Bookmarks   Tools   Help
 ◀ ○ × ⇧     http://www.oracle.com/us/.../dynamicscripts
 Dynamic Script Editor  +                          Back  Save  Save & Close  Cancel
 Script Name:  SalaryCalc
 Validate  Run  Refresh
 EDITOR                    ⛓→|↶/↷|  8pt  ▼ Groovy  ▼    ▶ Input Attributes        ▲
                                                        ▶ Output Attributes
  1   main = {                                          ▼      Methods
  2      coreApi ->                                     getInputList()
  3         def sqltxt = " select TABLE_NAME  from SYS.ALL_TABLES
               where table_name like 'FND_LA%' order by 1 ";   getInputValue()
  4         def rs = coreApi.getSqlRow(sqltxt);         getOutputList()
  5         def names = rs.toArray();                   getSqlRow(java.lang.St
  6         names.each { colval -> coreApi.debug(colval) };   debug(java.lang.String)
                                                        ...
  7   }
                        ↖ 101A
                                                                        223
 Script Log  Input Values  Output Values 0:  INFO - TABLE_NAME
  1:  INFO - FND_LABEL
  2:  INFO - FND_LABEL_TL
  3:  INFO - FND_LANGUAGES_B
  4:  INFO - FND_LANGUAGES_TL
                                                                    ▼
                                                         ↖
                                                          240
```

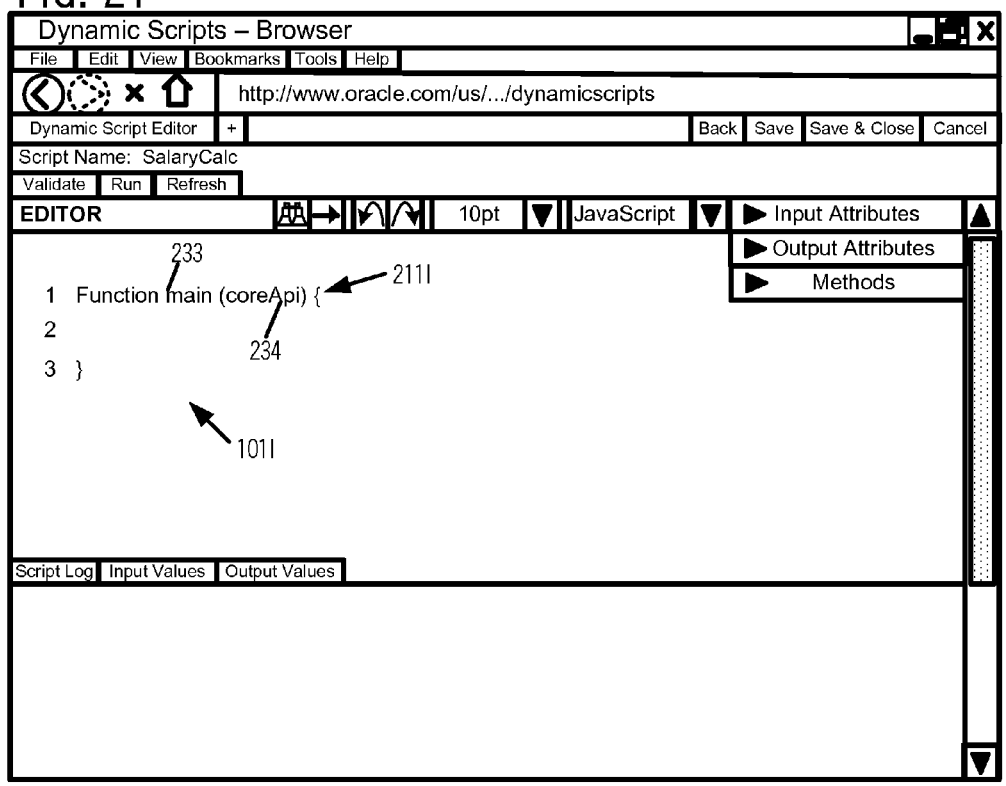

FIG. 3A

```
public class psudoCode_dynamic Script_process {
    try {
      /* Connect to database */
        DBTransactionImpl dbconn =   getTranactImpl(this) ;

/* get rowset/values needed by Script attributes */
114⟍    Row vr =   vo.getCurrentRow();

/* instantiate Dynamic Script Engine */
        DynamicScriptEngine fs = new DynamicScriptEngine(dbconn);

131⟍/* Resources class used to store objects passed to custom class
          can store  Vo, Vr, AM, ... */
        SalaryResources SalResources =   new  SalaryResources(this, vr);

/* Script Id to be used for this process (Jscript, groovy, ..) */
        int scriptId = get.scriptId;

/* call FS engine to run script
           Parameters: scriptId  - Script to be run
133N       Resources:  (Records, data, AM,...) needed for processing the script
         */
         fs.runScript(scriptId, SalResources );

/* get Log file created by script processor. Result of run is stored in
    SalResources   */
115⎯⎯       fslog = fs.getFsMainLog(); //Get all log file } catch (Exception ex) {
         /* Handle Exceptions */
     }

```
public void runScript(String scriptId, Object SalResources ) {
    /* get script-text, language, and base class name */
    String sqlText = "select fs.script_language, fs.script_text , fs.class_name from Dynamic_script_tbl  where fs.script_id = scriptId ";
    rs = executeScript(sqlText);
    SCRIPT_ENGINE_LANG engineLang = rs.get(0) ;
    String scriptText = rs.get(1);
    String className = rs.get(2);
```
141,142

```
    /* Valiate script syntax  */
111  if (isValidScript(engineLang, className, scriptText)) {

113    /* create a Dynamic script resources class  */
        FsResources fsResources = new FsResources(engineLang, className, tranImpl);

116    /*  Dynamically  instantiate  base interface.
            FsApiIntfc is Dynamic script base interface implemented by all classes
            which makes it possible to instantiate any custom dynamic class and use
            methods in interface across all classes
        */
307——Class c = Class.forName(className);
308——FsApiIntfc baseJavaApi = (FsApiIntfc)c.newInstance();

309—— Invocable mInvocableEngine;

/* Initialize custom class  */
310——  baseJavaApi.initClass(fsResources, SalResources);

/* Run Custom java class
        Run user defined ruby , groovy ,.. script .
Call top-level procedures and functions defined in scripts.
        */
            mInvocableEngine.invokeFunction("main", baseJavaApi);
311    /* once process is complete by get log file and output result */
            messageItems mFsMainLog = baseJavaApi.getLog();
            Map mOutputValues = baseJavaApi.getOutputValueList();
        }
}
```

FIG. 4

```
private boolean isValidScript(SCRIPT_ENGINE_LANG engineLang, String className,
                String scriptText) throws ScriptException,
                        ClassNotFoundException,
                        IllegalAccessException,
                        InstantiationException,
                        NoSuchMethodException {
    /* Validate custom class uses correct interface and implements base class */
    if (isValidFsClass(className)) {

/* Run script through script engine to check for syntax errors */
        ScriptEngineManager seMgr = new ScriptEngineManager();
        ScriptEngine se  = seMgr.getEngineByName(engineLang);
        Invocable invGroovy = (Invocable)se;
        se.eval(scriptText);
        return true;
    }
    return false;
}
```

```
public class SalaryResources {
    private RulesEngineAMImpl mRuleEngineAm = null;
    public SalaryResources () {
        super();
131
    public SalaryResources (Object ruleInputVO ) {
        super();
        mRuleInputVO = ruleInputVO;
    }
    public RulesEngineAMImpl getRuleEngineAm() {
        if (mRuleEngineAm == null) {
            mRuleEngineAm = getAM();
        }
        return mRuleEngineAm;
    } private static RulesEngineAMImpl getAM() {
        String aMClass = "oracle....applicationModule....AMImpl";
        String aMConfigFile = "RulesEngineAMLocal";
        RulesEngineAMImpl am =
(RulesEngineAMImpl)Configuration.createRootApplicationModule(aMClass,
        return am;
    }
```

FIG. 5B

```
protected HashMap<Long, TimeAttributeDetail> getInputDetailMap() {
    if (mInputDetailMap == null) {
      mInputDetailMap =
          TimeAttributeDetail.toMap(getRuleEngineAm().getTimeAttributeFieldP1());
    } return mInputDetailMap;
  } protected HashMap<Long, TimeAttributeDetail> getOutputDetailMap() {
    if (mOutputDetailMap == null) {
      mOutputDetailMap =
          TimeAttributeDetail.toMap(getRuleEngineAm().getTimeAttributeFieldP1());
    } return mOutputDetailMap;
  }

```
public class SalaryBaseDSApi extends DsApiBasePublic implements
DsApiIntfc { private WorkForceDsResource mApiResources = null;

private RulesEngineAMImpl mRuleEngineAm = null;

public WorkForceBaseDSApi() { super();

}

@Override protected void initInputList() { if (mInputDetailMap != null) {

Set entries = mInputDetailMap.entrySet();

Iterator it = entries.iterator();

while (it.hasNext()) {

Map.Entry entry = (Map.Entry)it.next();

TimeAttributeDetail ta = (TimeAttributeDetail)entry.getValue();

super.addInputList(ta.getName(), toDsDataType(ta.getAttributeType()), ta.getDisplayName());

}

}

}

@Override protected void initOutputList() { if (mOutputDetailMap != null) {

Set entries = mOutputDetailMap.entrySet();

Iterator it = entries.iterator();

while (it.hasNext()) {
```

FIG. 6B

```
Map.Entry entry = (Map.Entry)it.next();
        TimeAttributeDetail ta = (TimeAttributeDetail)entry.getValue();
        super.addOutputList(ta.getName(),
                    toDsDataType(ta.getAttributeType()),
                    ta.getDisplayName());
    }
   }
 }

@Override
 protected void initApiResources() {
    DsResources dsResources = super.getDsResources();
    mRuleEngineAm = mApiResources.getRuleEngineAm();
    mInputDetailMap = mApiResources.getInputDetailMap();
    mOutputDetailMap = mApiResources.getOutputDetailMap();
    super.setApiResources(mApiResources);
 }
 public void setProjectId(Long val) {
    this.mProjectId = val;
 }
 public Long getProjectId() {
    return mProjectId;
 }
 public int getMultiplyNums(int a, int b) {
    return (a * b);
 }
}
```

FIG. 7A

```
public class FsResources {                     132
    private String mClassName = null;
    private SCRIPT_ENGINE_LANG mEngineLang = null;
    private DBTransactionImpl tranImpl = null;

public void setEngineLang(FsConstant.SCRIPT_ENGINE_LANG val)
{
        this.mEngineLang = val;
    } public FsConstant.SCRIPT_ENGINE_LANG getEngineLang() {
        return mEngineLang;
    } public void setTranactImpl(DBTransactionImpl val) {
        this.tranImpl = val;
    }
}
```

FIG. 7B

```
public interface DsApiIntfc {
  104 void initResources(DsResources dsr);

Map<String, DsRecContext> getContextList();

Object getContextValue(String attrName);

Map<String, DsRecInput> getInputList();

Object getInputValue(String attrName);

Map<String, DsRecOutput> getOutputList();

Map<String, DsRecOutput> getOutputValueList();

Object getApiResources();

String getOutputValue(String attrName);

void setOutputValue(String attrName, Object Value);

void debug(String msg);

DsMessageItems getLog();

```
public abstract class DsApiBaseProtected {                    ──104
    protected DsApiBaseProtected() {  }
    protected DsApiBaseProtected(DsResources dsResources) {  }
    public void initResources(DsResources dsResources) {
        this.mDsResources = dsResources;
        this.mTranactImpl = dsResources.getTranactImpl();
        this.mApiResources = dsResources.getApiResources();
        initApiResources();
        initContextList();
        initInputList();
        initOutputList();
        setContextValues(dsResources.getContextValsMap());
        setInputValues(dsResources.getInputValsMap());
    }
    protected DBTransactionImpl getTranactImpl() {
        return mTranactImpl;
    }
    protected DsResources getDsResources() {
        return mDsResources;
    }
    protected Object getApiResources() {
        return mApiResources;
    }
    protected void setApiResources(Object val) {
        mApiResources = val;
    }
```

FIG. 8B

```
    protected Map<String, DsRecInput> getInputList() {
        Map<String, DsRecInput> inputList = getBaseInputList();
        if (inputList == null) {
            initInputList();
            inputList = getBaseInputList();
        }
        return inputList;
    }
    protected Map<String, DsRecOutput> getOutputList() {
        Map<String, DsRecOutput> outputList = getBaseOutputList();
        if (outputList == null) {
            initOutputList();
            outputList = getBaseOutputList();
        }
        return outputList;
    }
    protected abstract void initContextList();
    protected abstract void initInputList();
    protected abstract void initOutputList();
    protected abstract void initApiResources();
    protected void debug(MSG_SEVERITY logSeverity, String msg) {
        if (mLog == null) {
            mLog = new DsMessageItems();
        }
        mLog.add(logSeverity, msg);
    }
    public DsMessageItems getLog() {
        return mLog;
    }
}
```

FIG. 9A

```
public class classReflector {  ——————— 120 protected static List<DsValueList> getClassDetailAll(String classPath,
                                  ClassLoader cl) throws ClassNotFoundException {
    List<DsValueList> dtl = new ArrayList<DsValueList>();
    Class<?> c = getClassByPath(classPath, cl);
    dtl.add(getVal(DS_CLASS_DETAIL_TYPE.ClassName, c.getCanonicalName()));
    dtl.add(getVal(DS_CLASS_DETAIL_TYPE.Modifiers,
           Modifier.toString(c.getModifiers())));

getTypeParameters(dtl, c.getTypeParameters());
    getInterfaces(dtl, c.getGenericInterfaces());
    getSuperClasses(dtl, c);
    getAnnotations(dtl, c.getAnnotations());
    .....
    return dtl;
  }
  private static void getTypeParameters(List<DsValueList> d,
                        TypeVariable[] tv) {
    int i = 0;
    if (tv.length != 0) {
      for (TypeVariable t : tv)
        d.add(getVal(DS_CLASS_DETAIL_TYPE.TypeParameters, t.getName(),
             i++));
    }
  }
}
```

FIG. 9B

```
    private static void getInterfaces(List<DsValueList> d, Type[] intfs)
{
        int i = 0;
        if (intfs.length != 0) {
            for (Type intf : intfs)
                d.add(getVal(DS_CLASS_DETAIL_TYPE.Interfaces,
intf.toString(),
                        i++));
        }
    } private static void getSuperClasses(List<DsValueList> d,
Class<?> c) {
        int i = 0;
        List<Class> l = new ArrayList<Class>();
        getAncestor(c, l);
        if (l.size() != 0) {
          for (Class<?> cl : l)
                d.add(getVal(DS_CLASS_DETAIL_TYPE.SuperClasses,
                        cl.getCanonicalName(), i++));
        }
    }

}
```

DYNAMIC SCRIPTS TO EXTEND STATIC APPLICATIONS

BACKGROUND

It is well known in the prior art to use business rules in application programs that are executed in computers, as described in an article entitled "Smart Business Processes using Oracle Business Rules", by Gary Hallmark, 16 pages, published December 2008 that is incorporated by reference herein in its entirety as background. This article describes application logic that is modeled visually in Oracle JDeveloper and deployed to Oracle Fusion Middleware, featuring Oracle WebLogic application servers. Such application logic can be designed, changed, and understood by business people as well as IT (information technology) people. Oracle JDeveloper 11g is a tool that can be used for modeling business terms, rules, and processes. Modeling is an iterative activity. A new rule might require a new business term or specify an outcome that requires a change to the business process. Integrated tools make business analysts more productive. Hence, a Graphical User Interface (GUI) of the prior art can be used to prepare and/or modify such rules.

Moreover, prior art application programs, such as compensation software applications used by corporations to manage salaries and bonuses of their employees may use formulae written in a proprietary language, using a tool called "Fast Formula" in Oracle Human Resource Management System (HRMS), as described in the book "Oracle FastFormula User's Guide", Release 11.0, Part No. A58346-01, published 1995, pages 105, that is incorporated by reference herein in its entirety as background. Oracle FastFormula can get values for the variables in three ways: (1) receive them as input when the formula is called, (2) find the values in the database from database items, (3) use global values, which are entered in a Globals window. To get values from database items, the user clicks on a "Show Items" button in a formula window to display a window of available database items. The user must then copy and paste items from this window into a window in which the formula is being composed ("Edit Formula" window).

For illustrative details on prior art application programs, see the US Patent Application Publication 2010/0198634 A1 by Ty Hayden et al. entitled "Dynamic Calculations in an Employee Compensation System" published Aug. 5, 2010 that is incorporated by reference herein in its entirety, as background.

Such prior art methods have several drawbacks. Many such application programs are proprietary, with capabilities limited to certain software available at the time of development of these application programs. Moreover, such application programs may be integrated at the back end with software of other technologies, such as PL/SQL and/or relational databases, which can making these tools inefficient for use in other environments, such as Java.

Furthermore, software of such prior art application programs is typically compiled and deployed, which makes it difficult to change instructions therein, because any change to instructions requires re-compilation and re-deployment of the application program, resulting in long delays in its use in production computer systems. Such software may be customized in a limited manner by use of property files and/or command-line input used by instructions of the application program. However, to the knowledge of the current inventor, there appears to be no good solution in the prior art, to enable changes to instructions of an application while deployed, as described below.

SUMMARY

In several embodiments in accordance with the invention, one or more processors are programmed to receive software ("first software") written in a predetermined computer language ("first computer language"), in a process called "registration." After registration, the one or more processors prepare and display to the user, one or more new instructions in response to receiving at least two user inputs as follows: one user input ("first user input") identifies a name ("first name") of a method ("first method") in a plurality of methods that are defined in the first software, and another user input ("second user input") identifies a location within additional software ("second software") that is written in another predetermined computer language ("second computer language"), and which is executed in combination with the first software.

Specifically, in response to receipt of at least the first and second user input(s), one or more processors of some embodiments automatically modify a prior version of the second software at the user-identified location, by preparing and adding thereto at least one new instruction that is automatically formatted in a syntax of the second computer language, to obtain and display a new version of the second software. The new instruction that is included in the new version of the second software is prepared by the one or more processors to use at least the first name (identified by the first user input) to invoke execution of the first method in the first software. The new version of the second software may be changed by additional user input from users who know the second computer language but lack knowledge of the first computer language.

In some embodiments, the new instruction identifies a name of a set of instructions ("class") in the first software, wherein the class is identified by the one or more processors performing introspection on the first software, e.g. using Java reflection. In these embodiments, the first software is identified by the one or more processors from among multiple first softwares that may be registered, by an association between the first software and the second software, which association is initially made by the one or more processors in response to receipt of additional user input ("third user input"), prior to receipt of the first user input and the second user input.

Also in response to receipt of the third user input (described above), an initial version of the second software may be created automatically in several such embodiments, to include another instruction ("top-level instruction") that in turn includes at least one additional name (e.g. "main") that is predetermined by its use in one or more processors programmed to invoke execution of the second software. Such a top-level instruction may be prepared by the one or more processors to include as a parameter thereof, another additional name that identifies an instance of the first software (e.g. based on an association that was made on receipt of the third user input).

Execution of a combination of first software and second software as described above enables program functionality of an application program that is written in a compiled language (as the first computer language) to be modified at run time by user input (e.g. through a GUI browser interface) based on any scripting language (as the second computer language), and have the modified program functionality instantly available in a production computer system without having to compile or deploy any part of the change, as described briefly above and in further detail below.

BRIEF DESCRIPTION OF THE FIGURES

FIG. 1B illustrates, in a flow chart, certain acts of a method performed by a class-revealing script generator 120 in computer(s) 100 of FIG. 1A in some embodiments of the invention.

FIG. 2B1 illustrates a version of FIG. 2B, wherein first software is to be submitted for registration (by clicking on button 209) without error, including a status and a description in screen 201.

FIGS. 2I and 2Y illustrate a graphical user interface displaying a first instruction that is automatically generated when a new script is created, the first instruction being generated in the user-selected scripting languages Groovy (FIG. 2I) and JavaScript (FIG. 2Y) respectively, in some embodiments of the invention.

FIG. 2N illustrates a graphical user interface displaying a message of successful validation of the second software in the script of FIG. 2M, in some embodiments of the invention.

FIG. 2O illustrates a graphical user interface displaying a message of successful execution of the second software in the script of FIG. 2M, in some embodiments of the invention.

FIG. 2Q illustrates error messages displayed by the graphical user interface, when validation is performed on the script shown in FIG. 2P, in some embodiments of the invention.

FIGS. 2R-2W illustrate a graphical user interface displaying insertion into the script of FIG. 2I, of an instruction to invoke a method in the first software to access a database, in some embodiments of the invention.

FIG. 2X illustrates, messages in a results screen, on execution of the script of FIG. 2W, in some embodiments of the invention.

FIG. 3A illustrates pseudocode for processing of a script by processor 110 in FIG. 1A, in some embodiments of the invention.

FIG. 3B illustrates pseudocode for running of a script by processor 110 in FIG. 1C, in some embodiments of the invention.

FIG. 4 illustrates pseudocode for validation routines of module 111 in FIG. 1A, in some embodiments of the invention.

FIGS. 5A and 5B together illustrate pseudocode for an example of a resource, such as class resource 131 of FIG. 1A, in some embodiments of the invention.

FIGS. 6A and 6B together illustrate pseudocode for an example of an application-specific class such as classes 101Z, 102Z, and 103Z of FIG. 1A, in some embodiments of the invention.

FIG. 7A illustrates pseudocode for an example of another resource class, such as script resource 132 of FIG. 1A, in some embodiments of the invention.

FIG. 7B illustrates pseudocode for an example of classes shared by multiple applications, such as script-supporting classes 103 in FIG. 1A, in some embodiments of the invention.

FIGS. 8A and 8B together illustrate pseudocode for another example classes shared by multiple applications, such as script-supporting classes 104 in FIG. 1A in some embodiments of the invention.

FIGS. 9A and 9B together illustrate pseudocode for an example of a class used in script generator 120 of FIG. 1A, in some embodiments of the invention.

DETAILED DESCRIPTION

Figure 1A:
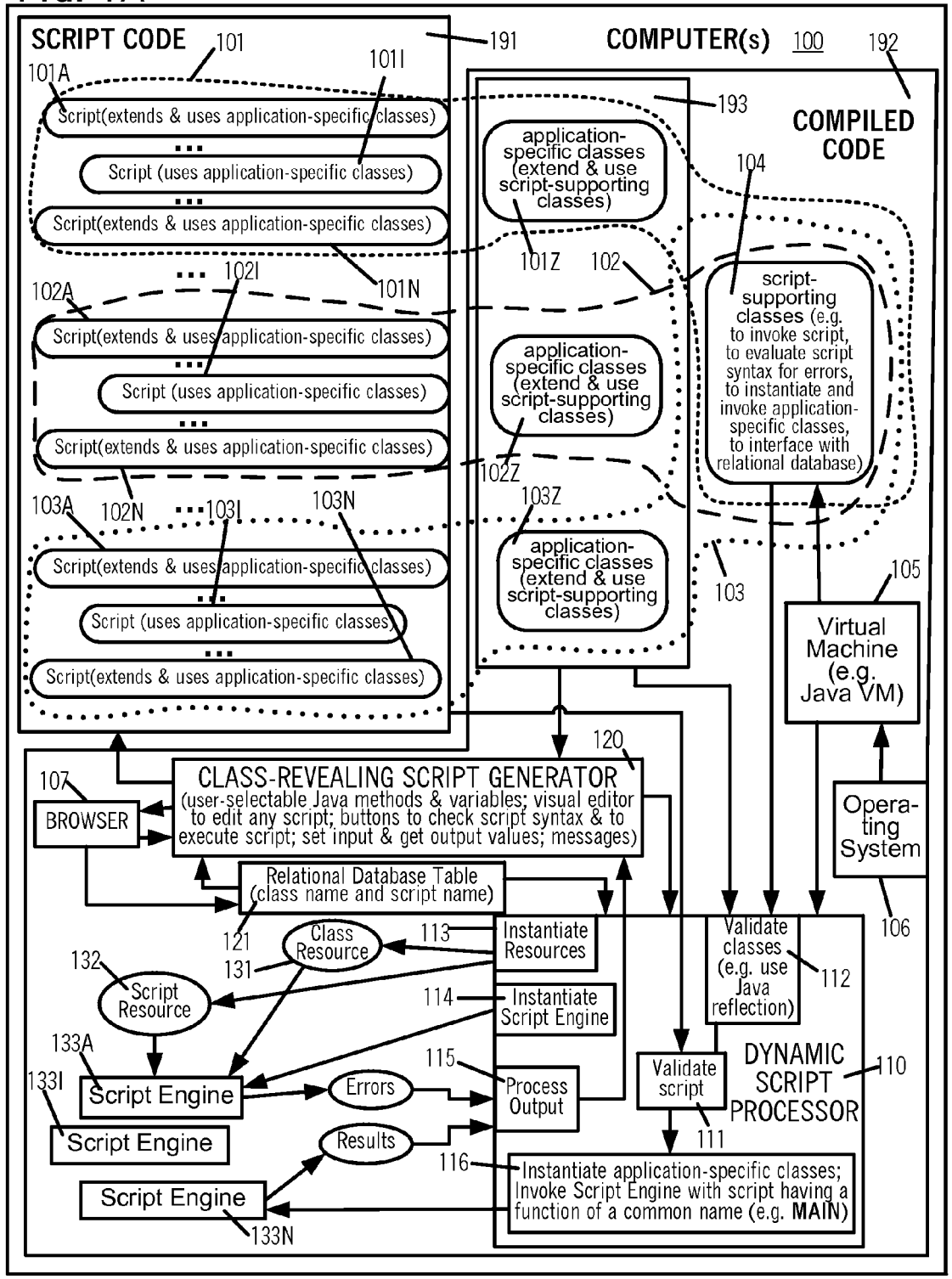
FIG. 1A illustrates, in a high-level block diagram, one or more computer(s) 100 that include script code 191 that extends functionality of compiled code 192 including a static application in the form of classes 101Z, 102Z and 103Z in some embodiments of the invention.

One or more computers 100 (FIG. 1A) are programmed in several embodiments of the invention to receive software, such as a specific set of classes 101Z (FIG. 1A) written in a predetermined computer language ("first computer language"), such as Java, in a process called "registration" (as per act 141 in FIG. 1B). Examples of classes that may be registered are illustrated in FIGS. 6A-6B. The registration process is implemented in some embodiments by a script generator 120 (FIG. 1A) that when executed by computer(s) 100 generates one or more portions of a graphical user interface including many screens of the type illustrated in FIGS. 2A-2Y, and described below.

Figure 2A:
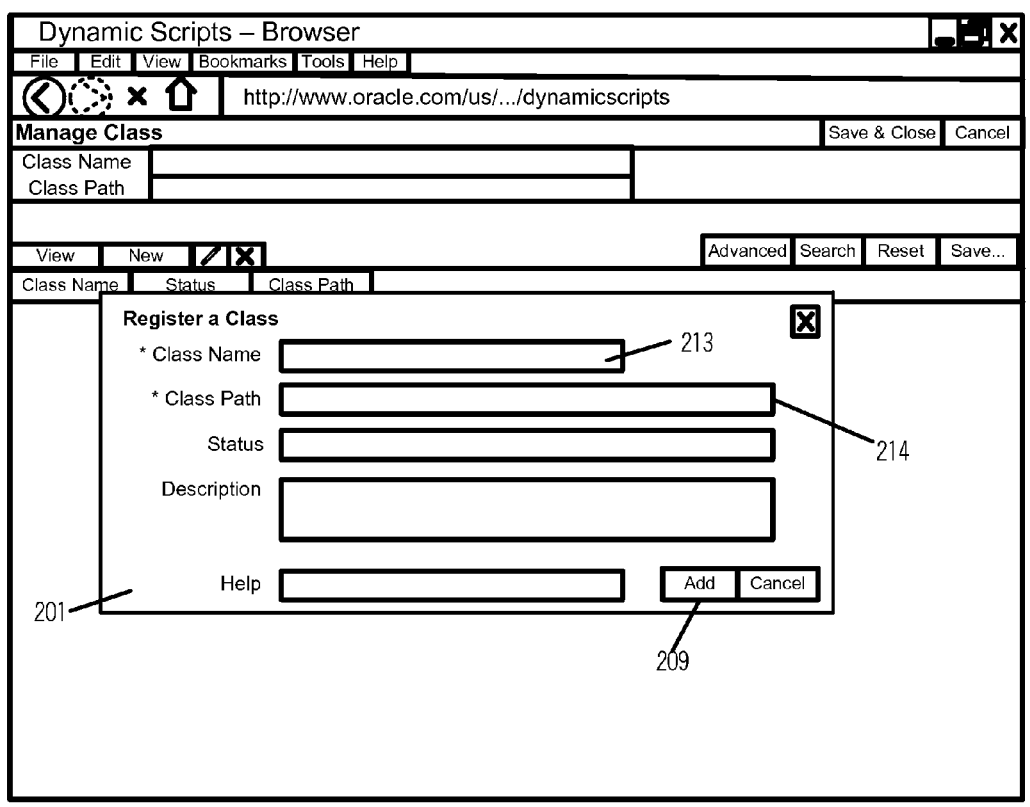
FIG. 2A illustrates a graphical user interface displayed by a browser 107 of FIG. 1A for registration of a first software that includes a group of application specific classes 101Z by the class-revealing script generator 120 of FIG. 1A in some embodiments of the invention.

As illustrated in FIG. 2A, user input received via a screen 201 (e.g. as a string of characters typed by a human on a keyboard) during registration identifies at least a name ("class name") of the set of classes 101Z to be registered in a field 213. In some embodiments, user input in field 213 received in registration as per act 141 is stored in a column of a table of a relational database, for use during execution as shown in pseudo-code in FIG. 3B. Additional user input in screen 201 also identifies a path ("class path") from which the set of classes 101Z is to be retrieved in another field 214. In screen 201, additional user input may be received, e.g. to identify a status of the set of classes 101Z, and a description of the set of classes 101Z.

In some embodiments, the set of classes 101Z being registered in screen 201 constitutes software ("first software") that is written in a specific computer language ("first computer language"), such as any high-level programming language. Therefore, a set of multiple classes 101Z received in registration, constitute one first software that has been compiled and deployed in computer(s) 100. Several such first softwares may be registered in the above-described manner by repeated use of screen 201. Hence, in several embodiments, a set of classes 101Z that is identified in each use of screen 201 is one among multiple sets 101Z, 102Z and 103C which constitute corresponding first softwares, each of which is compiled at least partially, ahead of time.

As will be readily apparent in view of this description, the multiple first softwares (collectively identified in FIG. 1A as softwares 193) may be compiled in whole or in part, depending on the first computer language in which the various sets of classes 101Z, 102Z and 103C are written. Also depending on the embodiment, classes 101Z, 102Z and 103C can all be written in a first computer language (such as Java) that is common relative to one another, or alternatively each first software (e.g. each of sets 101Z, 102Z and 103C) may be written in different first computer languages (such as Java, C++, Objective-C, etc). Although in several embodiments, a first computer language of the type described herein is object oriented, alternative embodiments may use non-object oriented languages.

Regardless of which language is used as the first computer language, each of first softwares 193 of many embodiments is prepared individually by a human (such as software developer, e.g. Java developer), then compiled and tested, followed by installation in the one or more computer(s) 100, prior to its registration in screen 201. Hence, each of first softwares 193 of such embodiments cannot be changed after deployment in computer(s) 100, without another cycle of development, compilation, testing and installation. Therefore, in numerous embodiments of the invention, each of first softwares 193 remains unchanged ("static") relative to additional software ("second software"), such as any of multiple softwares 101A-101N, 102A-102N and 103A-103N (FIG. 1A) typically prepared and changed repeatedly i.e. multiple times.

In several embodiments, second softwares 101A-101N, 102A-102N and 103A-103N are written in another computer language that is also predetermined ("second computer language"), which is different from the first computer language. The second computer language may be selected to facilitate repeated changes to one or more second softwares 101A-101N while the corresponding first software 101Z is kept unchanged (after compilation and deployment in computer(s) 100 of a production system in normal every-day use, such as a web-server used to sell books or another web-server used to run payroll). Hence, any one or more of scripting languages, such as Groovy, JavaScript, jRuby etc can be used as the second computer language in combination with a programming language such as Java used as the first computer language, in some illustrative embodiments.

In several embodiments, one of the first softwares 193 (e.g. a specific set of classes 101Z) is used in combination with one set of second softwares (e.g. software 101A-101N), another of the first softwares 193 (e.g. another specific set of classes 102Z) is used in combination with another set of second softwares (e.g. softwares 102A-102N), while still another of the first softwares 193 (e.g. still another specific set of classes 103Z) is used in combination with still another set of second softwares (e.g. softwares 103A-103N). Hence, each of application programs 101, 102 and 103 includes its own combination of one first software and a set of second softwares that may be changed repeatedly relative to the first software which remains static (during the changes to the second softwares). In addition to a first software and corresponding second softwares as just described, each of application programs 101, 102 and 103 of some embodiments may further include and share with one another in common, certain third software which is illustrated in FIG. 1A by classes 104 (also called "script-supporting" classes). Examples of script-supporting classes 104 are illustrated in FIGS. 8A-8B.

In several embodiments, computer(s) 100 (FIG. 1A) includes fourth software illustrated in FIG. 1A as a set of instructions 105 in the form of a virtual machine (such as Java VM) that executes script code 191 (which is a form of second software) by execution of a script engine 133I, which in turn executes first software 193 and classes 104 (which is a form of third software). Such fourth software in turn may use and interoperate with additional software, such as operating system 106 and relational database management system 1905 (FIG. 10B). In such embodiments, softwares 107, 106, 105, 104, 193, 110, 120, and 133A-133N (FIG. 1A) constitute compiled code 192 which results from compilation (in whole or in part) of source code written in one or more high-level computer language(s) such as the first computer language and this compiled code 192 is kept unchanged, while changing second softwares 101A-101N, 102A-102N and 103A-103N (FIG. 1A) that are source code 191 written in other high-level computer languages, such as second computer languages that are easy to change, such as any scripting language (e.g. Groovy, jRuby, JavaScript).

Using a combination of the type described above enables program functionality of application programs 101, 102 and 103 written in Java or other compiled language to be dynamically modified through a GUI browser interface (as illustrated in FIGS. 2I-2Y) using any scripting language and have the modified program functionality instantly available without having to compile or deploy any part of the change, as described below.

Therefore, in one illustrative embodiment, a specific set of classes 101Z (FIG. 1A) are prepared to implement various portions of a specific application program (and for this reason these classes are also referred to herein as "application-specific classes"). One example of such an application program uses as inputs the employees in an organization, the number of years each employee has worked, the department of each employee and the base salary of each employee and calculates and outputs bonuses and raises for each employee. In the just-described example, a specific set of application-specific classes 101Z may be named in a Class Name field 213 of screen 201 during registration (see FIG. 2A). Moreover, user input in Class Path field 214 identifies a location at which a file containing the specific set of application-specific classes 101Z is available.

Figure 1C:
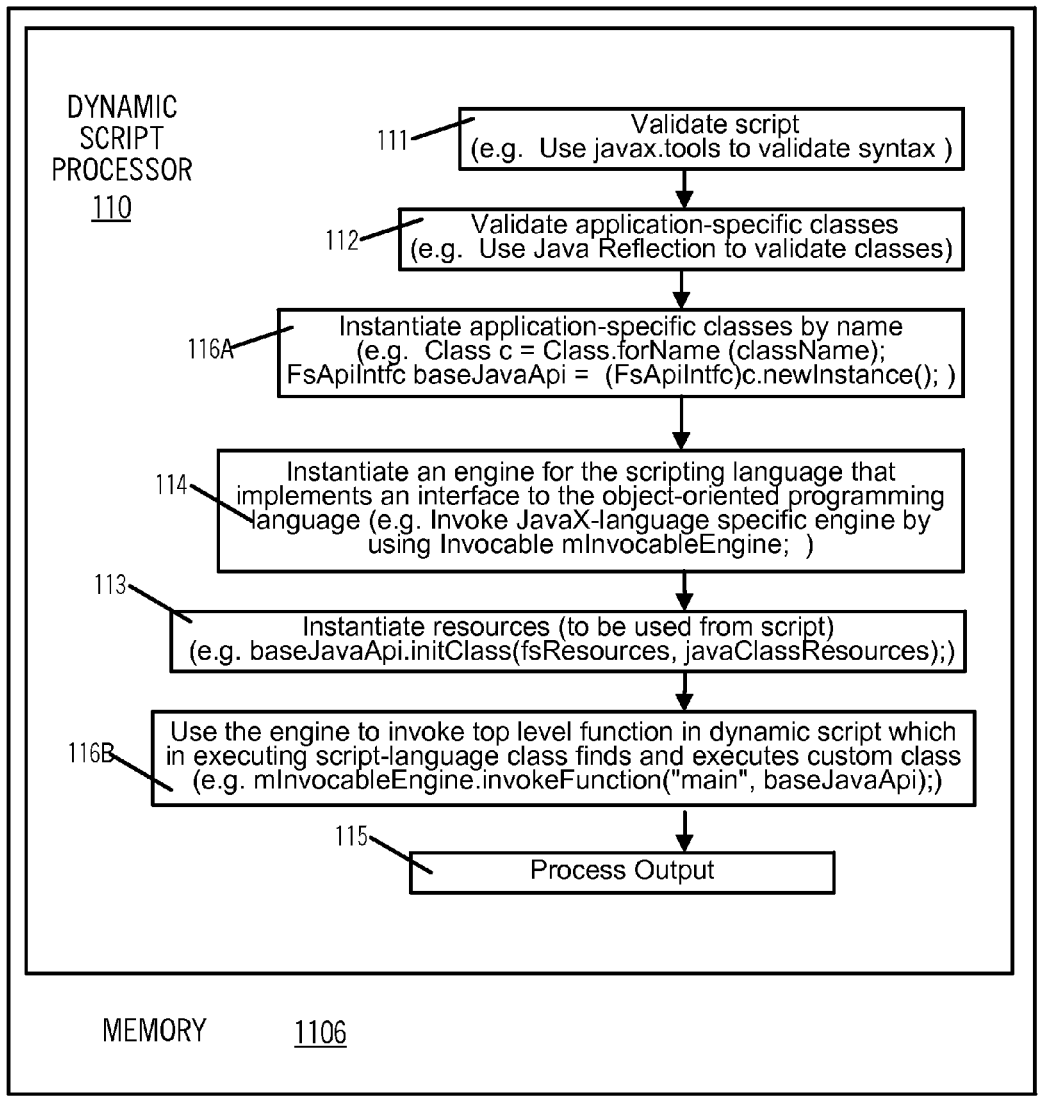
FIG. 1C illustrates, in another flow chart, additional acts of a module implemented by a dynamic script processor 110 in computer(s) 100 of FIG. 1A in some embodiments of the invention.
Figure 2B:
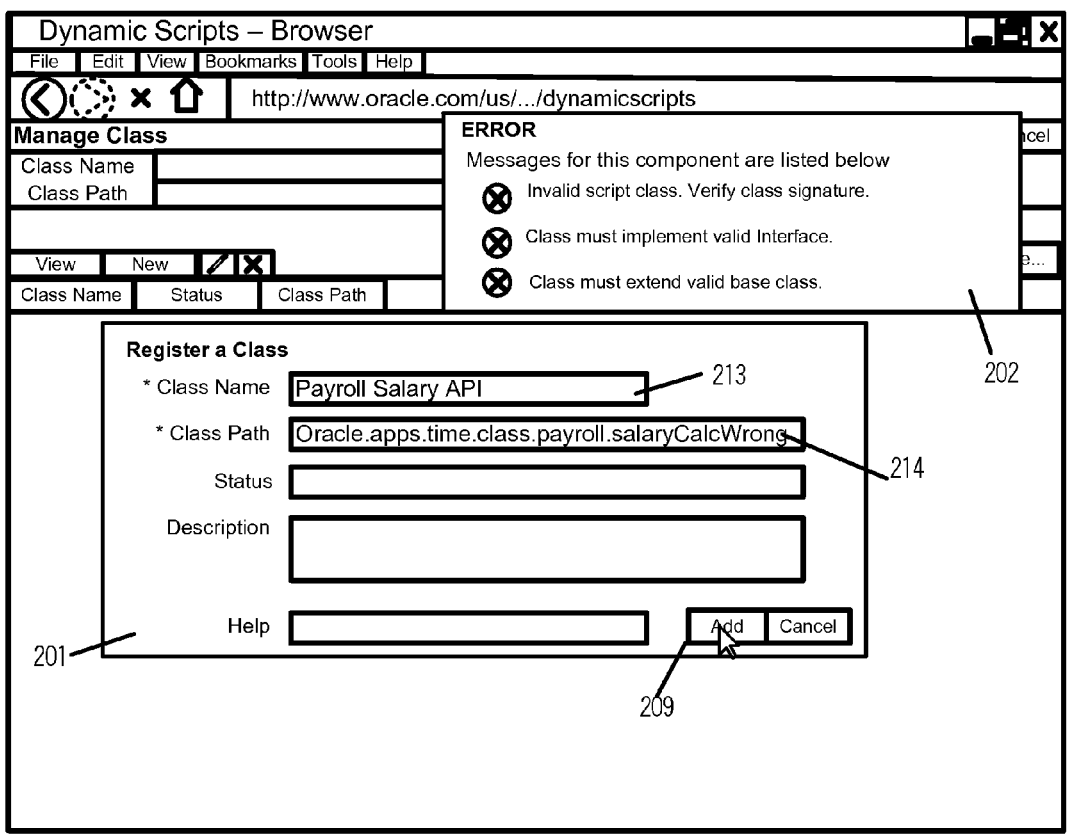
FIG. 2B illustrates a pop-up window with error messages displayed therein, when errors are found during validation of the first software submitted for registration as illustrated in the graphical user interface of FIG. 2A, in some embodiments of the invention.

In one illustrative example, a class containing errors has been identified by user input in field 214, as shown in FIG. 2B for the class "Payroll Salary API". On clicking the "Add" button 209 in screen 201 (FIG. 2B), the one or more computers 100 validate a path received via user input in Class Path field 214 as being accessible to computer(s) 100, followed by validation of the first software identified by user input in Class Name field 213 of screen 201 (FIG. 2A). The just-described validation may be performed by script generator 120, which may invoke an operation 112 (FIG. 1A) in a dynamic script processor 110 in computer(s) 100. In performing operation 112, computer(s) 100 check that all classes referenced are available either as classes 104 (FIG. 1A) also referred to as script-supporting classes, and/or as classes (not shown) in a library 105 of a virtual machine, such as Java VM. Any errors during such validation are displayed by computer(s) 100 in a pop-up screen 202 as illustrated in FIG. 2B via a browser 107 (FIG. 1A). In some embodiments, a human (such as a Java developer) uses browser 107 to correct such errors (as shown in field 214 of FIG. 2B1), followed by re-submission of application-specific classes 101Z (FIG. 1A) by clicking on button 209, as illustrated by loop 141L in FIG. 1B. As noted above, multiple sets of application-specific classes may be registered by repeated use of screen 201, as per loop 141L in FIG. 1B, although each set of application-specific classes must be registered with its own unique name, such as "Sample Payroll API" in Class Name field 213 and a corresponding path in Class Path field 214.

Figure 2C:
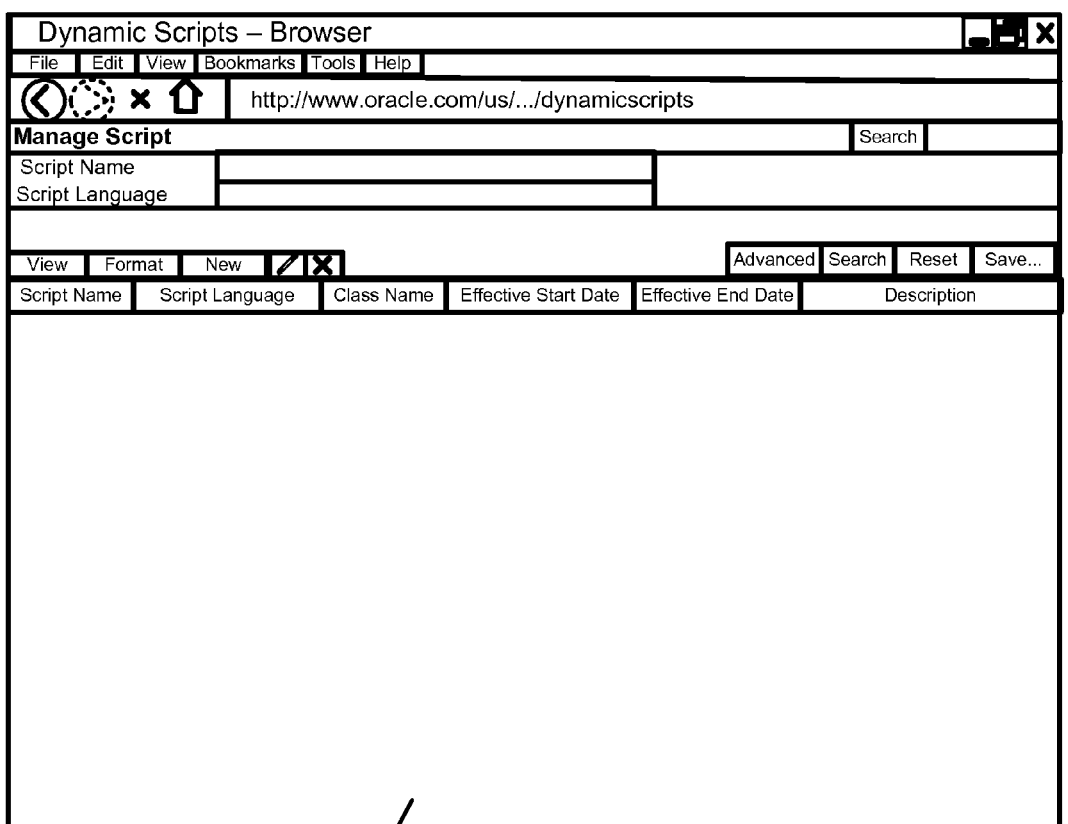
FIGS. 2C-2H illustrates a graphical user interface receiving user input that identifies a scripting language, a name of a script to be generated, and the first software to be used in the script, in some embodiments of the invention.
Figure 2D:
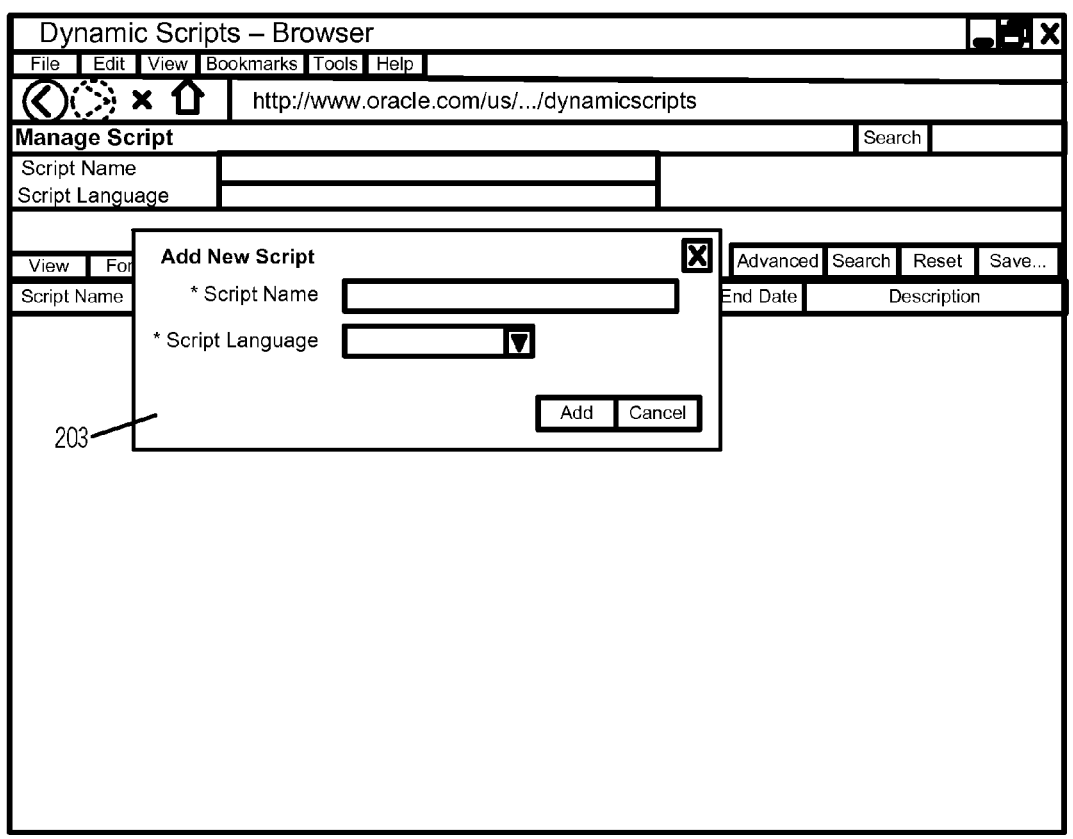

In several embodiments of the type described above, a human (such as a script writer) identifies in a graphical user interface (generated by script generator 120 of FIG. 1A), a second software, such as any of softwares 101A-101N, 102A-102N and 103A-103N to be created or modified, as illustrated in FIG. 2C. Specifically, one or more computers 100 (FIG. 1A) are programmed in several embodiments of the invention to receive, as per act 142 in FIG. 1B, user input (e.g. in the form of a mouse click with a cursor on an item in a drop-down list box) identifying another computer language ("second computer language") in which the second software is written (or is to be written). As illustrated in FIG. 2D, user input received via another screen 203 (with a function to add a new script), identifies at least another name ("script name") of the second software, and also identifies the second computer language. The second computer language identified by user input (e.g. a mouse click) in act 142 (FIG. 1B) in some embodiments may be a scripting language, such as Groovy, that is different from the first computer language, such as Java.

Figure 2E:
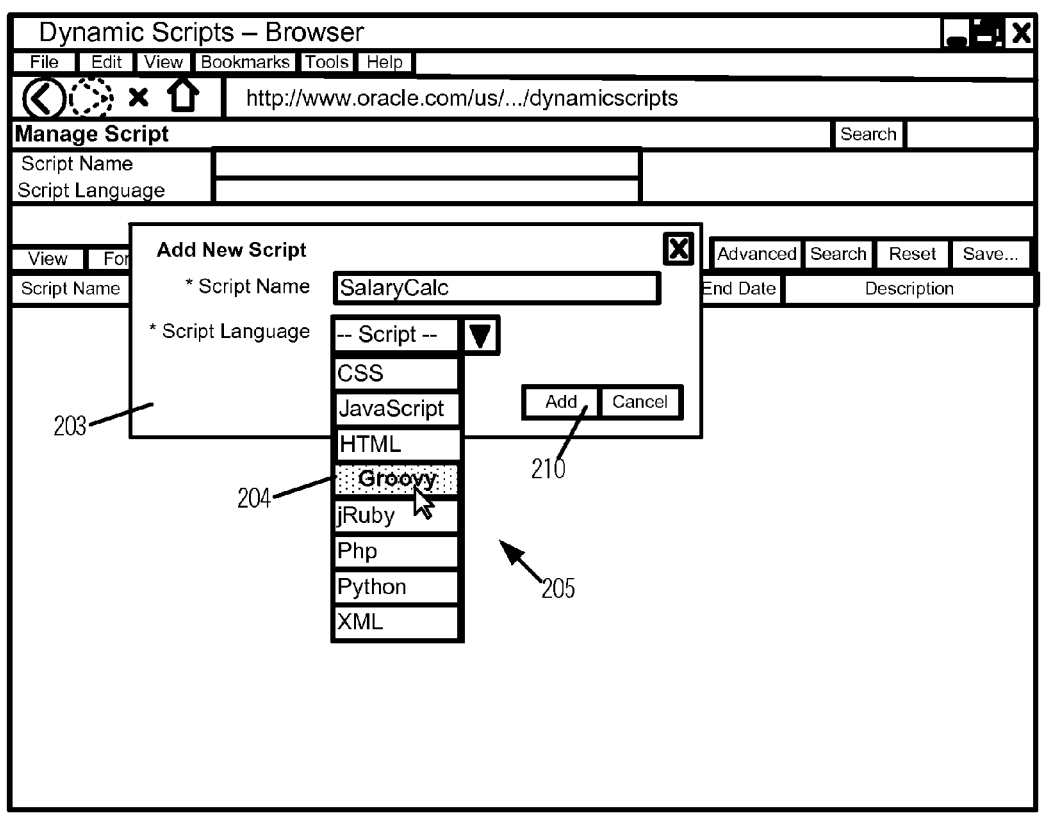

Such a second computer language may be identified by user selection of one specific language 204 from among multiple such languages, which are displayed via a browser 107 (FIG. 1A) as items of a drop-down list box 205, as illustrated in FIG. 2E. In such embodiments, softwares 101A-101N, 102A-102N and 103A-103N are implemented as scripts in files that together constitute script code 191 that can be easily modified by a user who knows one of the scripting languages (i.e. a "script writer"), who may or may not know the language (e.g. Java) in which one or more of first softwares 193 may be written.

Figure 2F:
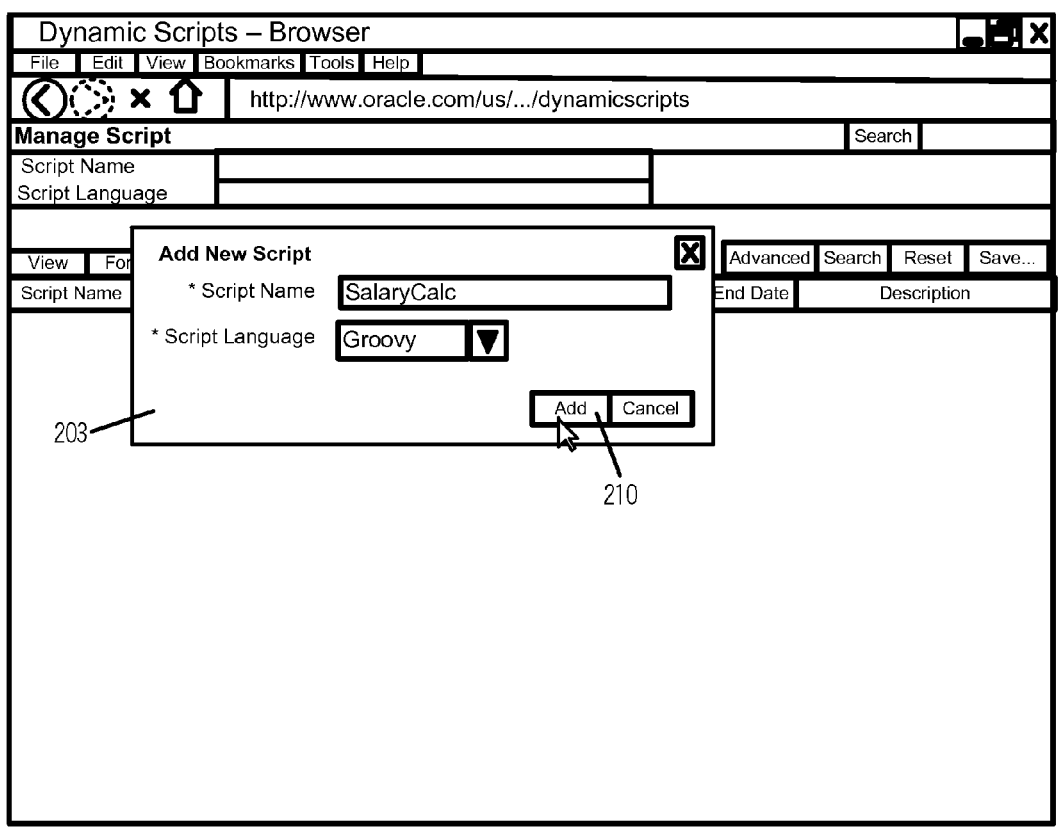

On clicking the "Add" button 210 in screen 203 (FIG. 2F), the one or more computers 100 display via browser 107, another screen 206 (FIG. 2G) to receive details on a to-be-created second software. Screen 206 of some embodiments includes a field 207 to receive user input as per act 143 (FIG. 1B), identifying one of first softwares 193 having a set of application-specific classes to be used in a second software which is to be changed repeatedly (while the classes being used remain static). In one such illustrative embodiment, user input (e.g. mouse click) in field 207 identifies one specific set of application-specific classes 101Z (FIG. 1A) selected from among multiple first softwares 193 that has been previously registered (e.g. as per act 141 in FIG. 1B). Specifically, names of multiple sets of classes 101Z, 102Z, 103Z of first software 193 are displayed in FIG. 2H, as items in another drop-down list box, in screen 206 of FIG. 2H. Also in screen 206 (FIG. 2H), a script writer may provide optional user input, such as an effective start date and an effective end date for use of to-be-created second software.

In one illustrative embodiment, script generator 120 stores a script name (received in act 142, e.g. identifying a script 101A) and an identifier of the specific set of application-specific classes 101Z (received in act 143) in association with one another in a row of a table of a relational database, such as table 121 (FIG. 1A). This association is thereafter used in computer(s) 100 whenever necessary to identify a first software (e.g. one set of application-specific classes) that is associated with a second software (e.g. a script), or vice versa. Such associations may be displayed to the user in a window 299 in a screen used to manage second softwares and their associations to first software, as illustrated in FIG. 2C.

In response to clicking the "Save" button 208 (FIG. 2H), the one or more computers 100 of certain embodiments automatically create and display, via browser 107, as per act 144 (FIG. 1B), an initial version of second software 101A as illustrated in FIG. 2I. The initial version of second software 101A has only one instruction 211A (also referred to as a "top-level instruction"), which includes one or more names 233 and 234 in some embodiments, as follows.

Figure 2G:
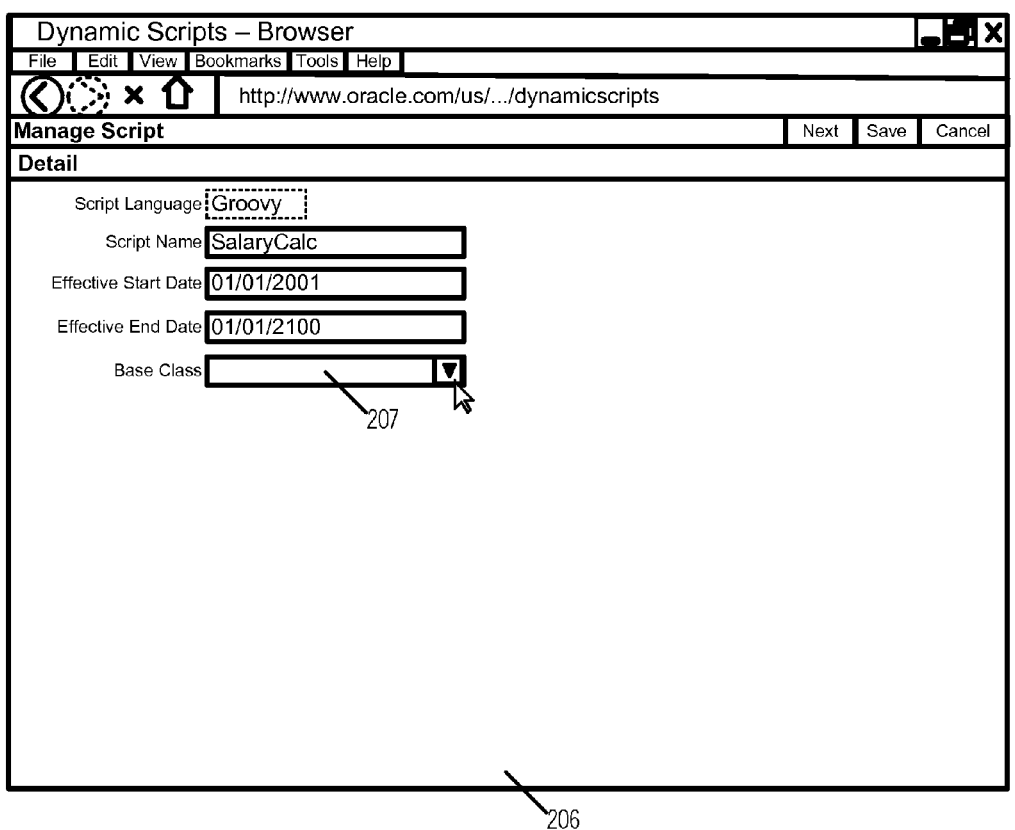
Figure 2H:
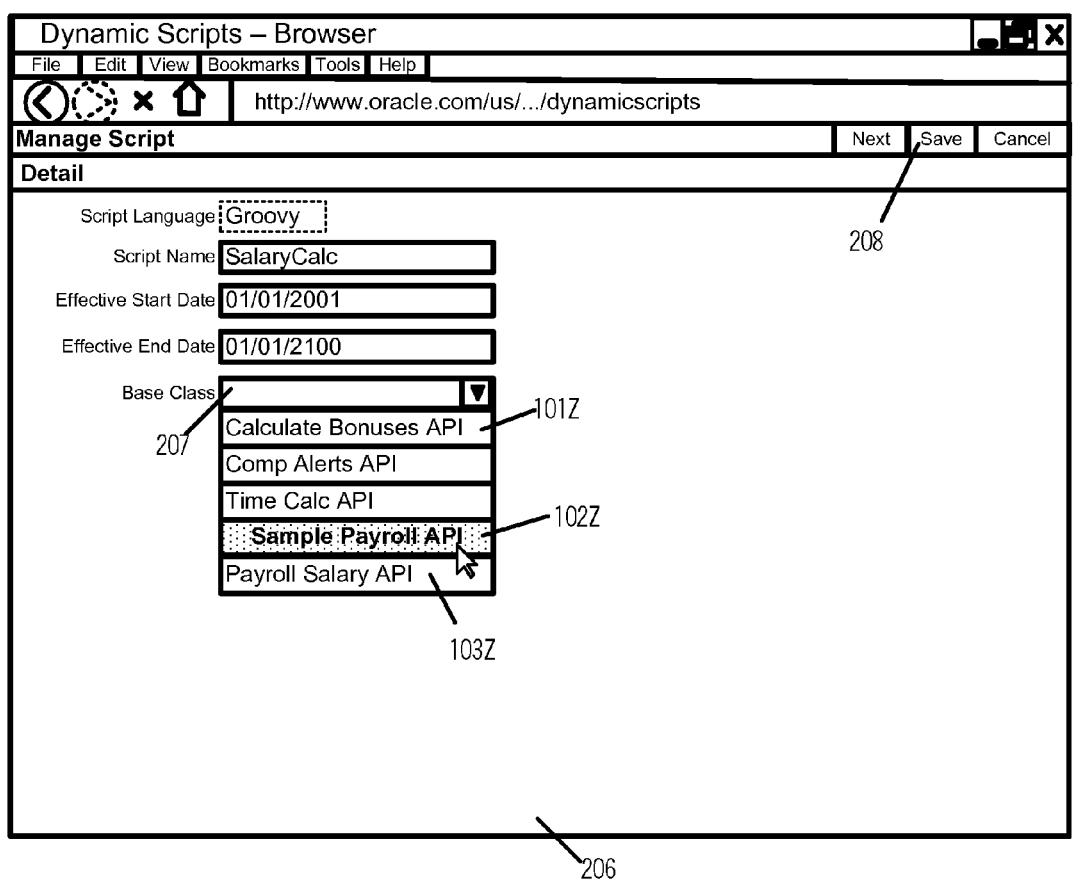
Figure 21:
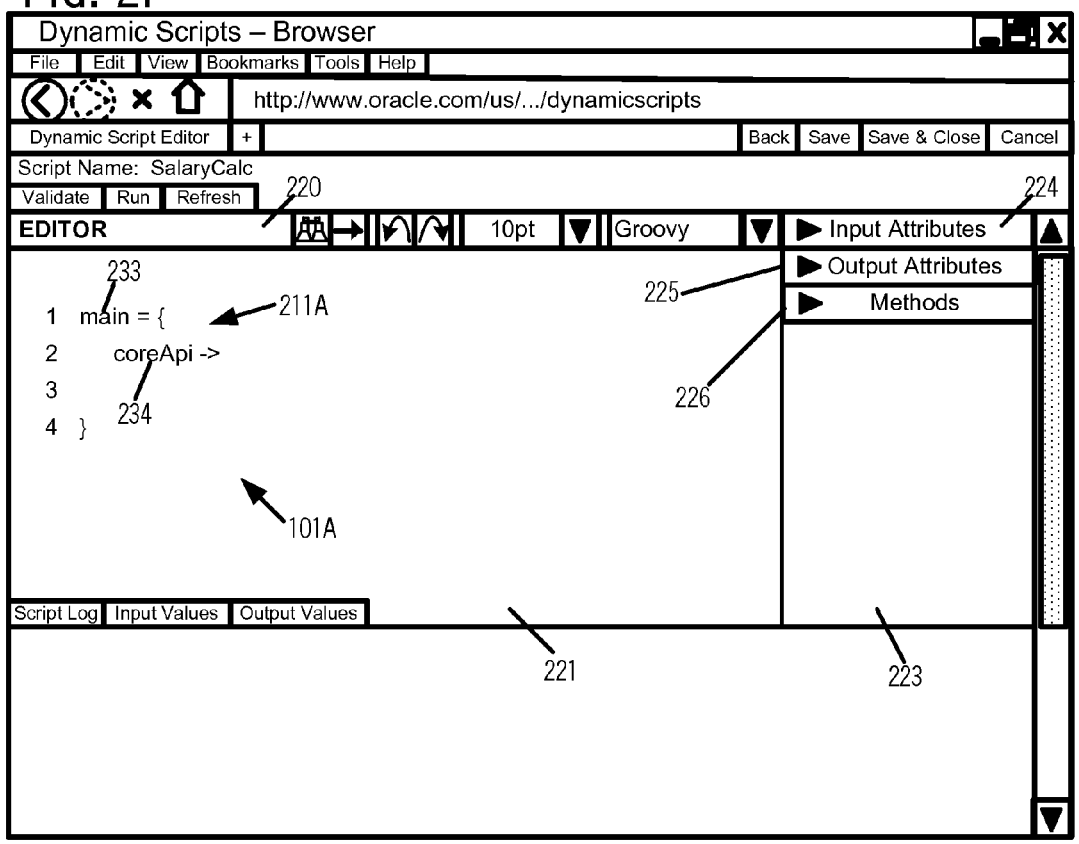

One name (also called "top-level function name") 233 that is used in top-level instruction 211A of such embodiments is predetermined (ahead of time) by its use by script processor 110 (FIG. 1A) to initiate execution of second software 101A by an engine (also called "script engine") 133N in computer(s) 100. Another name 234 may be additionally used in some embodiments to identify an instance of first software that is received (e.g. the name coreApi) including a specific set of application-specific classes 101Z that were previously identified by user input in field 207 in screen 206 (FIG. 2G) to form an association with second software 101A. Field 207 in FIG. 2G is populated by user selection of an item in a drop-down list box (not shown), which displays as items, the names of sets 101Z, 102Z and 103Z, previously registered individually by repeated use of screen 201 (FIG. 2B), as multiple first softwares 193.

As noted above, top-level function name 233 which is automatically included by computer(s) 100 in instruction 211A (as per act 144) is predetermined for use in an operation 116 (FIG. 1A) of processor 110 (also called dynamic script processor) to invoke execution of second software 101A (an initial version of which has just been created). Hence, top-level function name 233 is used in top-level instruction 211A by computer(s) 100 to identify a set of instructions that are invoked first, in execution of second software 101A. Accordingly, first name 233 of such embodiments is similar (or identical) to a reserved word in the second computer language, which cannot be changed or otherwise used by a script writer, in instructions added to second software 101A to form later versions. In two examples of these embodiments, the same word "main" is used as the first name (or top-level function name) in two second softwares 101A and 101I (FIG. 1A) written in two different languages, wherein corresponding instructions 211A and 211I are used as top-level instructions, although these two instructions use different formats, as shown in FIGS. 2I and 2Y respectively.

As will be readily apparent in view of this detailed description, other embodiments of computer(s) 100 may use another word as the top-level function name in a top-level instruction 211A or 211I, for example the word "Start" when this same top-level function name is also used (e.g. in processor 110) to begin execution of instructions in second software 101A. In such embodiments, instruction 211A and processor 110 use the same name (also called "common" name) to identify a specific set of instructions in the second computer language, at which a script engine 133I for that second computer language is to begin executing. Furthermore, although in certain embodiments described above the top-level function name 233 is predetermined to be one specific word that is commonly used in multiple second softwares, other embodiments permit flexibility, by use of indirection as follows.

In one embodiment of indirection, first name 233 is stored as a string that can be changed by user input, and a variable (also called pointer) that identifies the string is used by script processor 110 (FIG. 1A) to initiate execution of second software 101A. In this embodiment, such a string pointer is used in processor 110 to invoke execution of second software 101A and used as the top-level function name 233 in top-level function instruction 211A. Such indirection enables this embodiment of computer(s) 100 to use one word e.g. "Start" in one application program 101 when beginning execution of its second softwares 101A . . . 101I . . . 101N (in combination with first software 101Z), and additionally use another word "MAIN" (all letters upper case) in another application program 102 when beginning execution of its second softwares 102A . . . 102I . . . 102N (in combination with first software 102Z).

Moreover, in some embodiments, an additional name 234 is included by computer(s) 100 in top-level instruction 211A, formatted therein as a parameter of a top-level function identified by the top-level function name (as per a syntax of the second language), so that an instance of a class identified by this additional name ("instance name") 234 is passed (and received) in its entirety, when beginning execution of second software 101A. In the example illustrated in FIG. 2I, first instruction 211A includes as instance name 234 the word "coreApi" which identifies a set of application-specific classes 101Z (FIG. 1A) that were previously registered, and this same word is now identified in top-level instruction 211A as a parameter of the function "main" identified by name 233. Hence, an instance of classes 101Z is being passed in its entirety to a set of instructions identified by name "main" (which is a first name or "top-level function name" in this example) executed by a script engine 133N (FIG. 1A) for the scripting language Groovy, in beginning the execution of second software 101A.

In many embodiments, an instance of a specific set of application-specific classes 101Z is newly created (e.g. in operation 116 of FIG. 1A) immediately prior to execution of second software 101A, and this newly-created instance of a first software is passed in its entirety into an execution environment of second software 101A. In such embodiments, a script writer may provide user input to computer(s) 100 to add any instructions desired to second software 101A to use and/or extend objects in classes 101Z of the first software in the normal manner (as if these objects were instantiated in second software 101A), when the syntax of the second computer language supports object oriented programming. In alternative embodiments wherein the second computer language does not support object oriented programming, instead of passing an entire instance of first software 101Z, certain information needed to interface with classes 101Z may be passed in first instruction 211A, as will be readily apparent to the skilled artisan, The above-described first and second names in top-level instruction 211A are formatted automatically by the one or more computer(s) 100, in accordance with a syntax of a specific second computer language that has been previously identified by user input in act 142 (FIG. 1B). In one example, these two names are formatted to form instruction 211A which is expressed in the scripting language Groovy, as shown in FIG. 2I. Specifically, in FIG. 2I, the two names 233 and 234 in instruction 211A are formatted as per a syntax of the language Groovy, by use of a left curly brace "{" therebetween (without quotations). In the illustrated example, name 234 is followed by a dash "-" and a greater-than symbol ">", followed by a right curly brace "}", all without quotations which are used for convenience of description herein. To accommodate user input on additional instructions in second software 101A, one or more blank lines are included by script generator 120 between the greater-than symbol ">" (also without quotations) and the right curly brace "}". In another example, these same two names 233 and 234 are formatted by the one or more computer(s) 100 differently to form another instruction 211I, e.g. by use of a left parenthesis "(" therebetween, when expressed in the scripting language JavaScript, as shown in FIG. 2Y. In the just-described example, name 234 is followed by a right parenthesis ")" followed by a left curly brace "{", followed by one or more blank lines, followed by a right curly brace "}".

At this stage, a script writer can make any changes to second software 101A which is displayed by browser 107, in a window 221 of a visual editor 220 in FIG. 2I. Also shown in FIG. 2I, is another window 223 which includes multiple panels 224, 225 and 226 (all shown collapsed), for use by a script writer to add instructions to the initial version of second software 101A displayed in window 221. Although some embodiments use three panels 224, 225 and 226 as shown in window 223 of FIG. 2I, other embodiments may use additional panels, or fewer panels, depending on the embodiment.

Figure 2J:
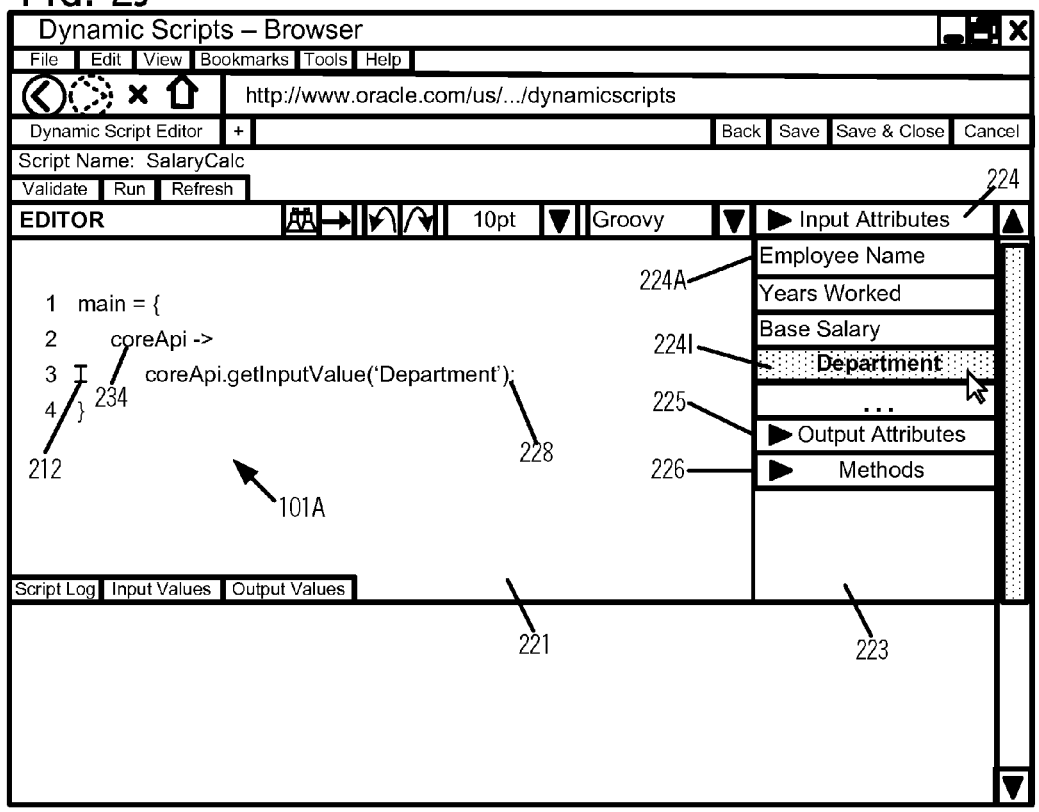
FIGS. 2J-2L illustrate a graphical user interface displaying insertion into the script of FIG. 2I, of an additional instruction generated in response to user input identifying a method of the first software, in some embodiments of the invention.

In response to receipt of a mouse click to open a panel (called "input attributes" panel) 224, computer(s) 100 identify and display multiple variables 224A-224I that have been made public in the user-identified classes 101Z, such as variable 224A called "Employee Name" and variable 224I called "Department" as shown in FIG. 2J. The variables being displayed are normally not visible to a script writer who is developing software in a second computer language, which is different from a first computer language in which classes 101Z are written. Specifically, computer(s) 100 execute an introspection operation on an instance of classes 101Z to obtain such variables for display, and based on user input these variables are then used to prepare new instructions added to second software 101A.

Script generator 120 (FIG. 1A) when executed by computer(s) 100 also performs introspection of classes 101Z which are available therein, on registration as per act 141 (FIG. 1B). Introspection of classes 101Z can be performed by computer(s) 100 in different ways, depending on the embodiment, and in some embodiments introspection is performed using Java reflection, e.g. as illustrated by the pseudo-code in FIGS. 9A-9B. Accordingly, script generator 120 (FIG. 1A) is also referred to herein as a "class-revealing" script generator. Script generator 120 does not display in window 223 any variables that are private (i.e. not public) to classes 101Z under introspection, including any classes referenced therein, such as script-supporting classes 104 (FIGS. 8A-8B). As noted below, in some embodiments, introspection using Java reflection is also performed by dynamic script processor 110 prior to execution of a script.

Referring to FIG. 2I, based on the results of introspection as noted above, computer(s) 100 display (as per act 147 in FIG. 1B) in window 223, multiple variables that have been made public by a first software 101Z, and hence available for selection by a script writer, for preparation of new instructions by computer(s) 100, to be added to second software 101A. At this stage, during creation or modification of second software 101A, script generator 120 does not perform introspection on (and hence does not display variables in) other first softwares 102Z and 103A, as they are not associated with the second software 101A being created or changed, even though the classes may already be deployed in computer(s) 100 (FIG. 1A). Display of names and receipt of input by computer(s) 100 in act 147 may be implemented similar or identical to the software called JDeveloper available from Oracle Corporation, or any other Integrated Development Environment (IDE).

Computer(s) 100 respond to receipt of user input, e.g. generated by a script writer clicking on variable 224I named "Department" (see FIG. 2J) in window 223, by automatically preparing and inserting (as per act 148 in FIG. 1B) a new instruction 228 into second software 101A in window 221, at a specific location identified by user input by placement of a cursor 212 (also called "insertion" cursor) in window 221. In some embodiments, insertion cursor 212 only identifies one dimension (e.g. along the y-axis), namely a line within second software 101A, such as line 3 shown in FIG. 2J, at which new instruction 228 is to be inserted. Computer(s) 100 may be programmed to automatically position new instruction 228 on another dimension (e.g. along the x-axis), e.g. by appropriate indentation within a line identified by cursor 212, in the normal manner of any code editor (such as JDeveloper). Although some embodiments use an insertion cursor 212 as illustrated and described herein, other embodiments use a drag-and-drop mechanism, wherein a user-selected item in window 223 is dragged by keeping a mouse button pressed while moving the mouse, until the mouse cursor reaches a user-selected location in second software 101A in window 221.

New instruction 228 which is inserted at such a user-selected location is prepared by programming computer(s) 100 to perform act 148 by use of an appropriate method (such as a "getter" method of classes 101Z in first softwares 193) to obtain a value of the user-selected variable (also called "input attribute"). As noted above, a specific method that is used in act 148 may be identified, in some embodiments, by introspection of classes 101Z. Specifically, the just-described value is obtained in some embodiments from an instance of classes 101Z created by operation 116 in FIG. 1A. In the example illustrated in FIG. 2J, new instruction 228 is prepared by computer(s) 100 to use a method "getInputValue" in an instance of classes 101Z, to obtain the value of the user-selected variable 224I named "Department."

New instruction 228 which is added to an initial version of second software 101A shown in FIG. 2I is formatted by computer(s) 100 in a syntax of the second computer language, e.g. in Groovy, this instruction 228 is formed as follows: instance name 234, as the word "coreApi" followed by a dot character "." followed by the method name "getInputValue", followed by a left parenthesis "(", followed by a single quotation mark "'" followed by the user-selected variable 224I, as the word "Department" followed by a right parenthesis ")" followed by a semicolon ";" as illustrated by a new version of second software 101A shown in FIG. 2J.

In a manner similar to that described above for panel 224, a script writer clicking on another panel (called "output attributes" panel) 225, causes computer(s) 100 to display (as per act 147 in FIG. 1B) multiple variables (not shown) that can be output on execution of instructions of second software 101A. Such variables may be used in instruction(s) that are prepared by computer(s) 100 (as per act 148 in FIG. 1B) for insertion into the current version of second software 101A at a user-identified location therein, by invoking another appropriate method (such as a "setter" method of classes 101Z) to set the value of a variable (called "output attribute") that is not shown, selected by the screen writer.

Referring back to FIG. 2I, also included in window 223 is a panel 226 that can be opened up by a script writer double clicking it to cause computer(s) 100 to display (and therefore reveal) multiple methods 226A, 226B, 226I (FIG. 2K), as illustrated by act 145 (FIG. 1B). Note that methods 226A, 226B, 226I which are displayed must be public to first software 101Z that is to be used in combination with a second software 101A that is being created and/or changed. Accordingly, methods that are private to classes 101Z are not displayed in window 223. Also not displayed are any classes that are defined in other first softwares 102Z and 103Z that are not associated with a second software 101A that is being created and/or revised.

Any method displayed in window 223 can be selected by a script writer, and on receipt of such user input as per act 145 in FIG. 1B, computer(s) 100 performs an act 146 to prepare a corresponding instruction in the second computer language to second software 101A in window 221. In an example, the initial version of software 101A is displayed in window 221 and the script writer is shown selecting the method 226I named "debug" in window 223 in FIG. 2K, and computer(s) 100 respond by adding a new instruction 229 to second software 101A at a user-identified location therein to obtain a revised version of second software 101A which is saved to memory, followed by displaying the revised second software 101A in window 221 as illustrated in FIG. 2L. In the above-described manner, second software 101A may be repeatedly revised any number of times by additional user input(s), while first software 101Z used therein remains unchanged (i.e. static).

Each new instruction 229 (FIG. 2L) that is automatically prepared and inserted by computer(s) 100 into second software 101A for use of first software 101Z includes the instance name 229I, namely "coreApi" which is commonly used in all such instructions, and this same name is also used as instance name 234 in top-level instruction 228. The instance name which is commonly used in instructions 228 and 229 identifies an instance of classes 101Z that are instantiated by computer(s) 100 specifically for use in execution of second software 101A.

One example of new instruction 229 (FIG. 2L) as initially inserted by computer(s) 100 is a template, which includes a descriptor 229D in the form a character string that describes a parameter to be used in execution of the user-selected method, e.g. the method "debug" in FIG. 2L. In some embodiments, descriptor 229D is initially populated in instruction 229 by computer(s) 100, to document that a character string is the data type of an input parameter of the method in first software 101Z, thereby to notify the user as to the user input to be supplied, to customize the template.

Hence, in this example the character string "java.lang.String" is used as descriptor 229D in instruction 229 to initially display to a user (e.g. a script writer), the data type expected by method "debug" for its input parameter, which is to be identified by the user, as illustrated in FIG. 2L. In an alternative embodiment, the descriptor in instruction 229 may be populated by computer(s) 100 to be of a data type in the second computer language, such as "Gstring" in Groovy (which is a Groovy version of the Java String data type).

At this stage, a script writer may edit second software 101A in window 221 to change the instruction 229 displayed in template form (in FIG. 2L), by inclusion of descriptor 229D. Computer(s) 100 is programmed to replace descriptor 229D in response to receipt of user input in window 221, to overwrite descriptor 229D with a variable name or a value to be used as the input parameter (of method "debug"). For example, a script writer may supply user input in the form of string "Hello Groovy World" as shown in FIG. 2M, which is used in second software 101A as a value for input parameter 229S. Instead of a value as just described, a variable name, such as "sqltxt" in second software 101A may be used to overwrite descriptor 229D, as illustrated in FIGS. 2T and 2U.

After second software 101A is revised any number of times as desired by a script writer, based on user input, e.g. in window 223 to add instructions based on a first software 101Z and/or in window 222 to change instructions in second software 101A, a script writer may click on a button 231 to validate a current version of second software 101A as illustrated in FIG. 2M. In response, computer(s) 100 perform an operation 111 (FIG. 1A) to check syntax of second software 101A, to ensure conformance with the second computer language. In some embodiments, operation 111 includes use of javax.tools to validate the syntax, e.g. based on introspection to obtain interfaces of classes 101Z (in one of first softwares 193 previously identified by the user in field 207 of screen 206). Any methods and attributes in classes 101Z that are used in software 101A may be checked in operation 111 (see FIG. 4) to ensure they are properly extended and/or used therein, as illustrated by pseudo-code in FIG. 3B (used to validate script syntax).

Application-specific classes 101Z of some embodiments are written to extend one or more script-supporting classes 104 (FIG. 1A), and hence introspection of classes 101Z for validation in some embodiments includes performance of introspection of classes 104 (see FIGS. 8A-8B). In such embodiments, multiple sets of application-specific classes 101Z, 102Z and 103Z in first softwares 193 (FIG. 1A) share a single set of script-supporting classes 104 that implement functions that are commonly used in interoperation with and support of second softwares 101A-101N, 102A-102 and 103A-103N (FIG. 1A), such as syntax checking, evaluating errors, and interface to a relational database. Such sharing of classes 104, between multiple sets of classes 101Z, 102Z and 103Z reduces programming work that is otherwise required by developers of different applications (in the absence of sharing).

To sum up, computer(s) 100 respond to a command generated by a user clicking button 231 in FIG. 2M, by checking syntax of a current version of second software 101A in window 221, and display the results of syntax checking in a window 240, e.g. as a message 241 in FIG. 2N. In this example, message 241 indicates that the code in window 221 has been verified as being syntactically correct, i.e. that there are no syntax issues.

At this stage, a script writer may click on button 232 to generate another command to computer(s) 100 to execute a current version (also called "changed version") of second software 101A, without changing the first software. Computer(s) 100 respond to the command generated from clicking button 232 in FIG. 2O, by executing second software 101A, and display the results of execution in window 240, e.g. as a message 242 in FIG. 2O. The execution of second software 101A automatically causes execution of first software associated therewith, namely application-specific classes 101Z and/or script-supporting classes 104. In this example, computer(s) 100 display a message 242 (FIG. 2O) in the form of the string "Hello Groovy World" that had been used as a value of an input parameter of the user-selected method 226I, named "debug".

The just-described process enables a script writer to easily change an application program even after deployment, e.g. in a production system. Specifically, the script writer may change only script code 191 (FIG. 1A) that contains second software and do so without changing any of the first software in the compiled code. For example, classes 101Z and/or classes 104 that are executed with a current version of second software 101A are same as classes 101Z and/or classes 104 that were executed previously with an earlier version (or even the initial version) of second software 101A prior to preparation of the new instruction. Hence, first software is executed unchanged (relative to changes to a prior version of the second software), even when first software is used in combination with a changed version of second software (resulting from preparation and storage of the new instruction).

Note that although input values for second software 101A are specified in some embodiments in a user-selected first software 101Z, certain embodiments of computer(s) 100 display input values in a tab 248 of window 240 (FIG. 2O), as name-value pairs (i.e. name of input variable and its value). In such embodiments, computer(s) 100 receive user input in this tab 248, identifying values to be input to second software 101A, and it is these user input values (from tab 248) that are thereafter used, e.g. the next time second software 101A is executed. Moreover, such embodiments of computer(s) 100 also display in another tab 249, values output by execution of second software 101A. Values can be input in tab 248 and output in tab 249 in any of several different ways, as will be readily apparent in view of this detailed description. Hence, a specific layout of fields of name value pairs in tabs 248 and 249 is not a critical aspect in many embodiments, unless described otherwise herein.

A specific manner in which second software 101A is executed by computer(s) 100 is different in different embodiments. Computer(s) 100 of some embodiments are programmed to implement a dynamic script processor 110 (FIG. 1A) that performs one or more of operations 111-116 illustrated in FIG. 1C. In one illustrative embodiment, when second software 101A is to be executed, a script generator 120 of FIG. 1A notifies script processor 110 to begin execution. In turn, script processor 110 responds to such notification by performing validation operations 111 and 112. As noted above, operation 111 validates second software 101A (e.g. in the form of a script 101A, by use of javax.tools). Moreover, table 121 is used by script processor 110 to identify and validate the first software 101Z that is associated with and used in second software 101A (e.g. validate classes 101Z identified by user input in field 207 in screen 206). Operations 111 and 112 may be performed by dynamic script processor 110 in any order relative to one another.

When the results of operations 111 and 112 indicate no errors, then dynamic script processor 110 performs operation 116A to instantiate by name, the specific set of application-specific classes 101Z. For example, the method "forName" in a Java class may be used in some embodiments. One embodiment of processor 110 instantiates classes 101Z, as illustrated by instructions 307 and 308 in FIG. 3B. Instantiation by name as just described enables dynamic script processor 110 to be used with any set of classes 101Z, 102Z and 103Z that may be selected by user input in field 207 of screen 206 (in contrast to hard-coding of a set of class names requiring a different version of instantiation instructions for each set of class names).

After instantiation of the specific set of application-specific classes 101Z, dynamic script processor 110 performs operation 114 to identify and instantiate (and/or initialize) one of script engines 133A-133N, for use in execution of instructions in a script 101A expressed in the second computer language (e.g. Groovy). For example, the name of script 101A may be used with a lookup of a table 121 in a relational database, to identify the language of instructions in script 101A (which language was originally received as user input in screen 203, and thereupon stored in table 121). As noted herein, each script engine 133I implements an interface from instructions in first computer language, namely the language of application-specific classes 101Z (e.g. Java), to instructions in one of multiple second computer languages (such as Groovy, jRuby, JavaScript). At this stage, script engine 133I may be instantiated as illustrated by an example of operation 114 shown in pseudo-code in FIG. 3A, in Java.

In some embodiments, each of multiple script engines 133A-133N implements, for a corresponding scripting language, functionality to support the Java Scripting API (application programming interface) framework defined in JSR-223, e.g. as described in the package javax.script for the Java Platform Standard Ed. 6 available from Oracle Corporation. For more details see "Specification: JSR-223, Scripting for the Java Platform Specification" by Mike Grogan, released Jul. 31, 2006 that is incorporated by reference herein in its entirety. The Java Scripting API consists of interfaces and classes that define the Java Scripting Engines and provides a framework for use in Java applications. One embodiment of processor 110 invokes execution of a JavaX-language specific engine, by using Invocable mInvocableEngine as illustrated by instruction 309 in FIG. 3B.

Referring to FIG. 1C, after act 114, dynamic script processor 110 performs operation 113 to instantiate and/or initialize resources for use in application-specific classes 101Z (instantiated in act 116A), so that the resources can be used in execution of second software 101A. One embodiment of processor 110 initializes one or more class resources 131 and script resources 132, as illustrated by operation 113 in pseudo-code of FIG. 3B. Examples of class resources are illustrated in FIGS. 5A-5B, and examples of script resources are illustrated in FIGS. 7A-7B. In some embodiments, class resources are used to store objects that are passed to application-specific classes (also called "custom" classes) as shown in pseudo-code of FIG. 3A by item 131. Such a processor 110 may also instantiate a base interface, as illustrated by operation 116 in pseudo-code of FIG. 3B.

At this stage, script engine 133N (e.g. for the language Groovy) is ready in some embodiments, and so processor 110 performs act 116B (FIG. 1C) to use the engine 133N to invoke a top-level function in second software 101A (as shown in FIG. 3A). Any of acts 116A, 116B and/or operation 116 may implemented in different embodiments, in combination with one another to share instructions that may be commonly used by script generator 120 and script processor 110. As will be readily apparent in view of this detailed description, the functionality of script generator 120 shown in FIG. 1B and the functionality of script processor 110 shown in FIG. 1C can be all integrated together and implemented as a single piece of software, or divided up differently and implemented as other pieces of software, depending on the embodiment.

As noted above, a top-level function at which all execution initially begins in second software 101A is identified by a name (also called top-level function name). One embodiment of script processor 110 uses engine 133N to invoke the top-level function "main", as illustrated by instruction 311 in FIG. 3B. Results of execution of the "main" function are thereafter conveyed by script processor 110, as per act 115 (in FIG. 1C) to script generator 120. In the pseudo-code of FIG. 3A, act 115 is implemented to get a log file created by the script processor and results of execution stored in the class. Script generator 120 displays the results of execution in window 240, e.g. as a message 242 in FIG. 2O.

The above-described operation of script processor 110 implements two-way visibility, between the first computer language and the second computer language. Specifically, software in a first computer language (e.g. Java) in the form of script engine 133N invokes execution of software in script 101A in the second computer language (e.g. Groovy). Moreover, as illustrated in FIG. 2M an instruction 229 within script 101A in the second computer language (e.g. Groovy) may itself invoke a method (e.g. "debug") in a set of classes (e.g. "coreAPI") in the first computer language (e.g. Java). Such two-way visibility provides flexibility as described herein, in use of scripts (e.g. in script code 191) to dynamically extend application programs that are otherwise static.

Although many features that illustrate certain embodiments are described above, other features of some embodiments also in accordance with the invention are described below. For example, FIG. 2P illustrates introduction of a syntax error in line 3 of second software 101A, by the script writer adding the string "v" at the end of the instruction. After doing so, and clicking the validate button 231 in FIG. 2P generates a command to cause computer(s) 100 to check syntax and display multiple messages 243 documenting the syntax error(s), in window 240 as shown in FIG. 2Q.

Figure 2K:
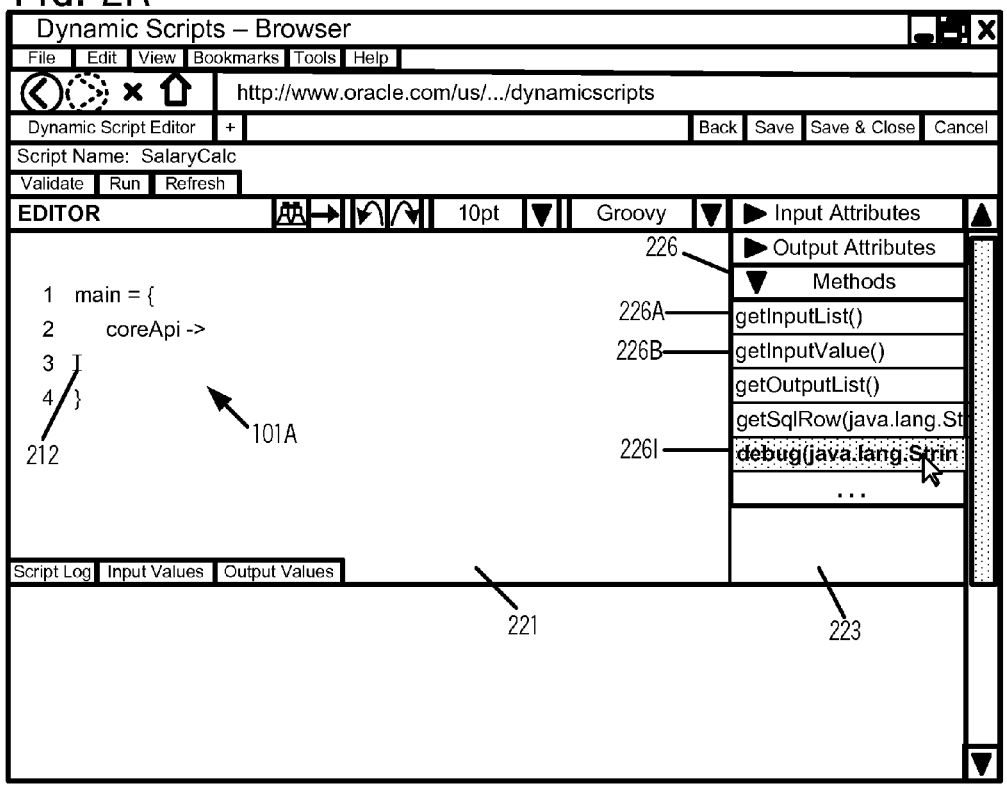
Figure 2L:
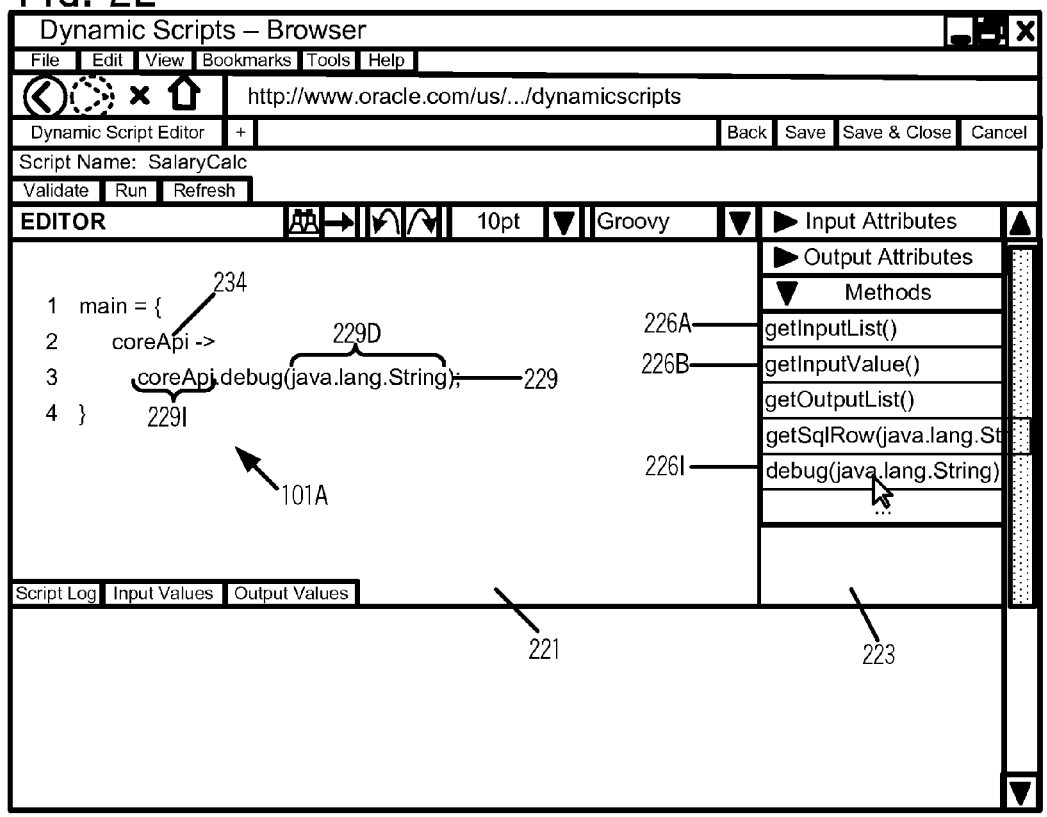
Figure 2M:
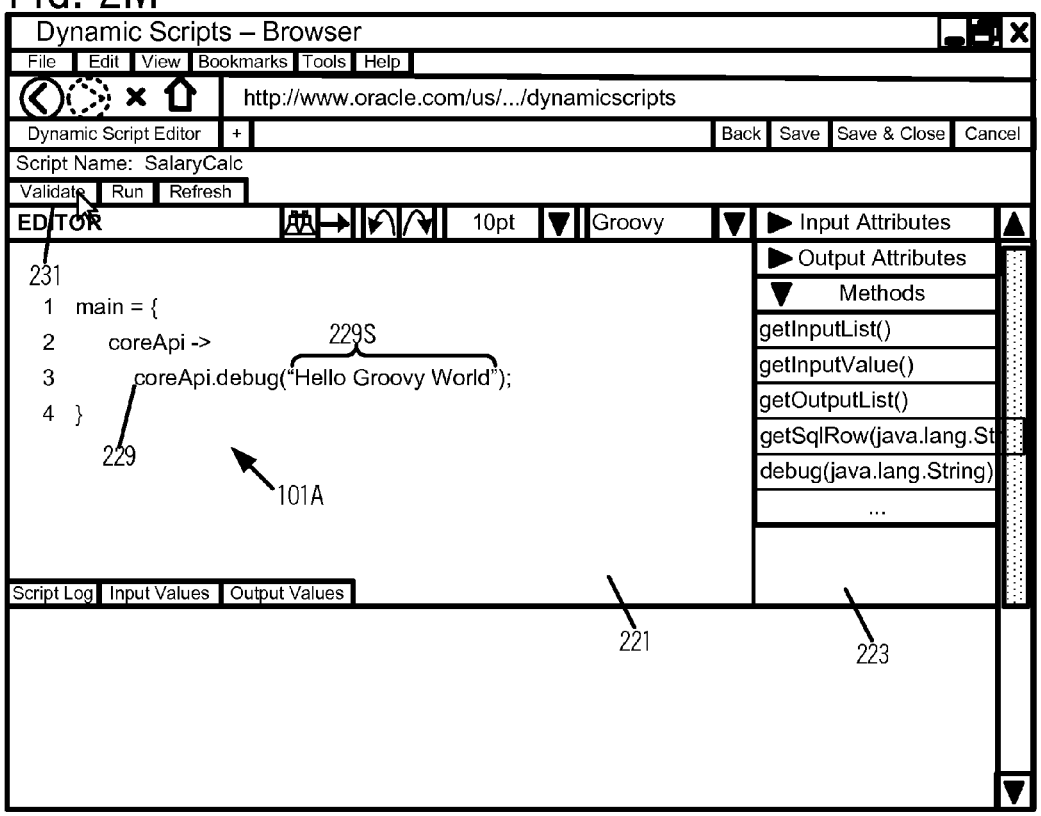
FIG. 2M illustrates a graphical user interface displaying overwriting of an identifier of a data-type in the script of FIG. 2L by additional user input, in some embodiments of the invention.
Figure 20:
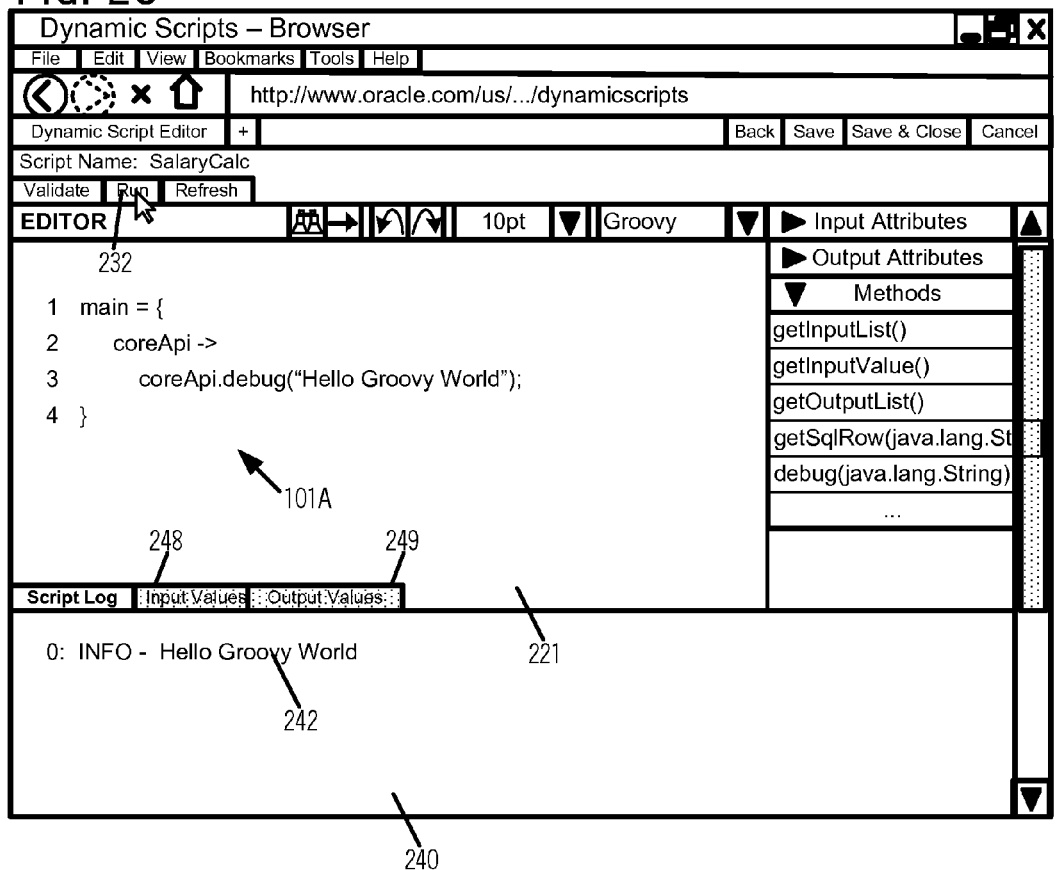
Figure 2P:
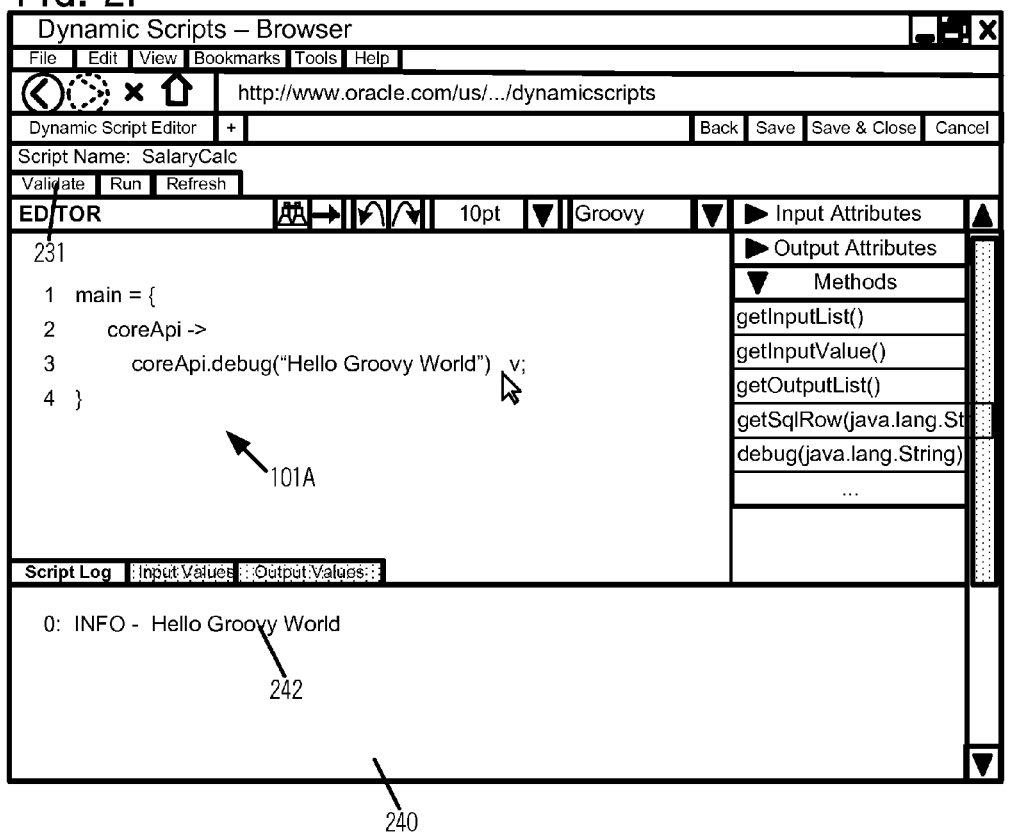
FIG. 2P illustrates a graphical user interface displaying insertion into the script of FIG. 2M, of an error to be used to test validation, in some embodiments of the invention.
Figure 2T:
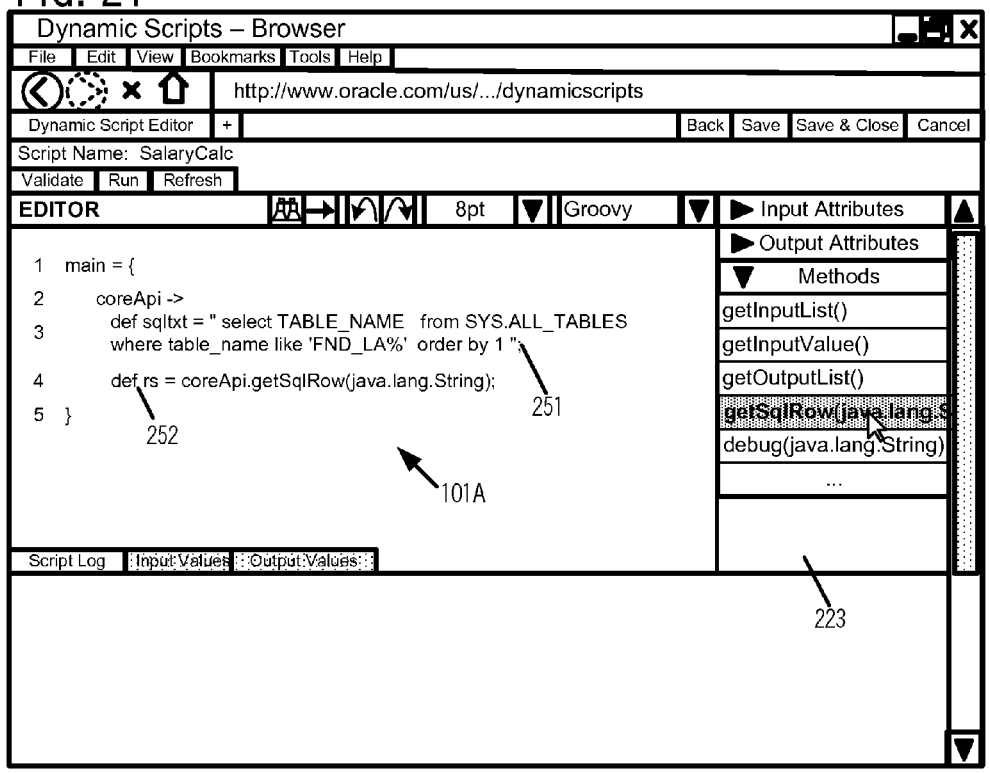
Figure 2U:
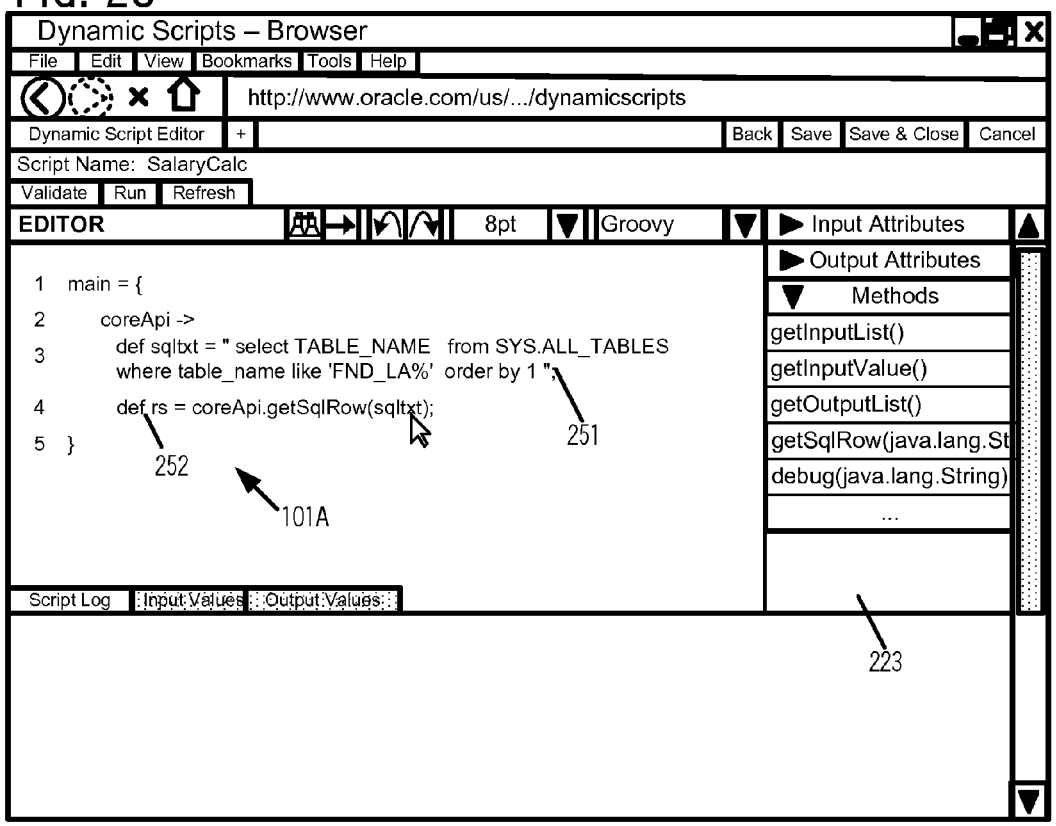

FIG. 2R illustrates, in line 3 of second software 101A, addition by a script writer of a second instruction 251 in the second computer language, to a first version shown in FIG. 2K initially created with a top-level (also called "first") instruction at lines 1 and 2. Specifically, at line 3, the script writer types on a keyboard user input to initialize a variable 'sqltxt' to a character string containing a query to a relational database, expressed in structured query language (SQL). As shown in FIG. 2R, the query in one embodiment includes a "select" clause which identifies a column name as "TABLE_NAME", followed by a "from" clause which identifies a table name in the relational database as "SYS.ALL_TABLES", followed by a "where" clause which identifies a condition to be met to retrieve rows from the identified table of the relational database, followed by an order by clause, written in the normal manner. Accordingly, FIG. 2R shows a second instruction 251 in a second version of second software 101A.

FIG. 2S illustrates a next step in the example of FIG. 2R, wherein the script writer adds a third instruction 252 in the second computer language at line 4 of second software 101A, to be used to obtain a row set from the relational database by first typing in "def rs=" followed by clicking on a method 226J in the first computer language named "getSqlRow" as illustrated in FIG. 2S, resulting in a third revised version of second software 101A illustrated in FIG. 2T. Note that a class name "coreApi" in this example has been automatically included in instruction 252 on line 4.

Figure 2V:
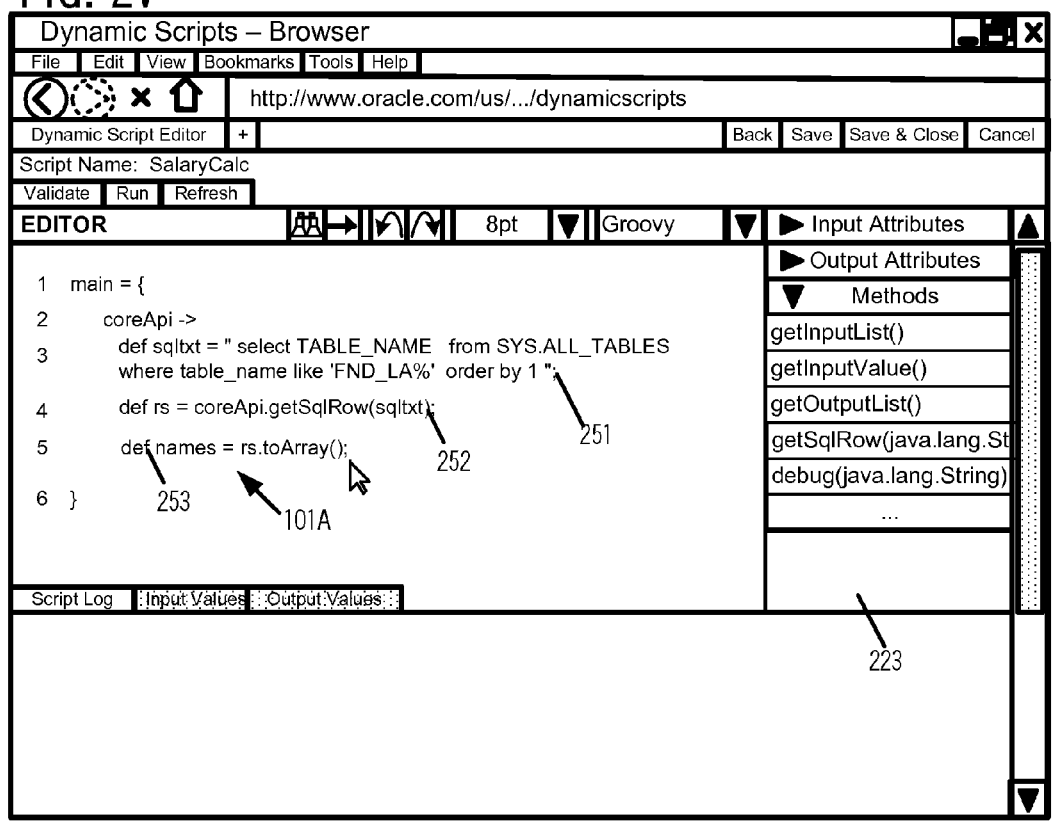

Next, in this example, the script writer replaces a data type in the third instruction 252 in line 4 with the variable 'sqltxt' that was defined in line 3, resulting in a fourth revised version of second software 101A as shown in FIG. 2U. Then, as shown in FIG. 2V, the script writer adds at line 5 in the second software 101A, a fourth instruction 253 in the second computer language to access an array that is returned in the row set, on execution of the query to the relational database (described above), to initialize the variable 'names' resulting in a fifth revised version of second software 101A. Finally, as shown in FIG. 2W, the script writer adds a fifth instruction in the second computer language to second software 101A in line 6, to print out the names using the 'debug' method in the first computer language (described above).

Figure 2W:
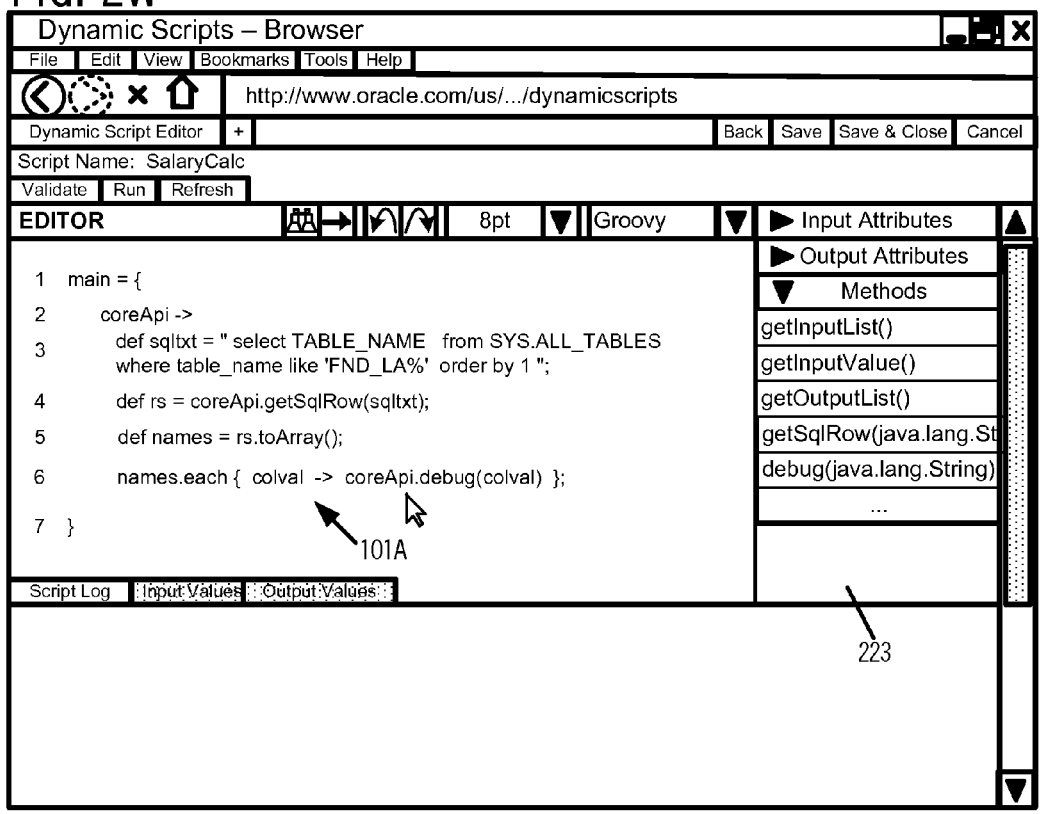

Second software 101A illustrated in FIG. 2W, although written in the scripting language Groovy, uses and/or extends functionality of one or more classes 101Z in first software written in the programming language Java. Although FIGS. 2K and 2R-2V illustrate only five (5) instructions in second software 101A, as will be readily apparent to a skilled artisan in view of this detailed description, such user input in the second computer language may add to second software 101A, any number of instructions Ni (e.g. one or more orders of magnitude larger than shown in FIG. 2W) and any number of variables Nv (also one or more orders of magnitude larger than shown in FIG. 2W), which are interrelated with one another in second software 101A. The Ni instructions added by user input to second software 101A may be written to use and interrelate with any number of methods Nm, and any number of attributes Na of a first software 101Z, which are displayed to the user (and so documented) in window 223.

Thus, embodiments of the type described above combine execution of second software 101A (FIG. 1A) which can be changed during normal operation of computer(s) 100, with execution of first software 101Z which is kept unchanged during normal operation of computer(s) 100. Such a combination of second software and first software can be used to implement application programs with any amount of programming logic of any complexity, while keeping first software static and changing only the second software which supports instant customization of the application programs even when the first software is already deployed and currently in use in a production system. However, the first software can also be changed in alternative embodiments, e.g. by a user who is a programmer (e.g. Java developer) to support customization of application-specific classes 101Z, 102Z and 103Z (FIG. 1A) in a specific production system, while other software such as classes 104 are kept unchanged (relative to first softwares 193). In the just-described alternative embodiments, the changed classes are typically re-deployed, by halting operation of the specific production system, which is re-started after the re-deployment at which time another user who is a script writer (e.g. in Groovy) may prepare second software as described above.

One illustrative embodiment that uses the Java Scripting API is described in pseudo-code shown in FIGS. 3A-9B that can be readily understood by any Java developer, in view of this description.

Use of scripts 101A-101N with a specific set of classes 101Z for an application program enables a human being ("script writer") to quickly and easily change run-time behavior of the combination of first and second software, i.e. classes 101Z and scripts 101A-101N. The script writer can quickly and easily prepare and/or change the second software (scripts 101A-101N), and do so without changing (or even knowing how to change) the first software i.e. classes 101Z. Moreover, scripts 101A-101N can be written in any one of several scripting languages that may be object oriented, enabling the combination (of the first software and the second software) to be changed by any script writer who knows one of the scripting languages.

The methods of FIGS. 1B and 1C may be used to program one or more computer(s) 100, each of which may be implemented by a computer system 1000 of the type illustrated in FIG. 10A which is discussed next. Specifically, a computer system 1000 includes a bus 1102 (FIG. 10A) or other communication mechanism for communicating information, and one or more processor(s) 1105 coupled with bus 1102 for processing information. Computer system 1000 uses (as the above-described memory) a main memory 1106, such as a random access memory (RAM) or other dynamic storage device, coupled to bus 1102 for storing information and instructions (e.g. for the methods of FIGS. 1B, 1C) to be executed by processor 1105.

Main memory 1106 also may be used for storing temporary variables or other intermediate information during execution of instructions to be executed by processor 1105. Computer system 1000 further includes a read only memory (ROM) 1104 or other static storage device coupled to bus 1102 for storing static information and instructions for processor 1105, such as script processor 110. A storage device 1110, such as a magnetic disk or optical disk, is provided and coupled to bus 1102 for storing information and instructions.

Computer system 1000 may be coupled via bus 1102 to a display device or video monitor 1112 such as a cathode ray tube (CRT) or a liquid crystal display (LCD), for displaying information to a computer user may be displayed on display 1112. An input device 1114, including alphanumeric and other keys (e.g. of a keyboard), is coupled to bus 1102 for communicating information to processor 1105. Another type of user input device is cursor control 1116, such as a mouse, a trackball, or cursor direction keys for communicating information and command selections to processor 1105 and for controlling cursor movement on display 1112. This input device typically has two degrees of freedom in two axes, a first axis (e.g., x) and a second axis (e.g., y), that allows the device to specify positions in a plane.

As described elsewhere herein, class-revealing script generator 102 and dynamic script processor 110 are implemented by computer system 1000 in response to processor 1105 executing one or more sequences of one or more instructions that are contained in main memory 1106. Such instructions may be read into main memory 1106 from another non-transitory computer-readable storage medium, such as storage device 1110. Execution of the sequences of instructions contained in main memory 1106 causes processor 1105 to perform the operations of a process described herein and illustrated in FIGS. 1B and 1C. In alternative embodiments, hard-wired circuitry may be used in place of or in combination with software instructions to implement the invention. Thus, embodiments of the invention are not limited to any specific combination of hardware circuitry and software.

The term "computer-readable non-transitory storage medium" as used herein refers to any non-transitory storage medium that participates in providing instructions to processor 1105 for execution. Such a non-transitory storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110. Volatile storage media includes dynamic memory, such as main memory 1106 which may be implemented in the form of a random access memory or RAM.

Instructions to processor 1105 can be provided by a transmission link or by a non-transitory storage medium from which a computer can read information, such as data and/or code. Specifically, various forms of transmission link and/or non-transitory storage medium may be involved in providing one or more sequences of one or more instructions to processor 1105 for execution. For example, the instructions may initially be comprised in a non-transitory storage device, such as a magnetic disk, of a remote computer. The remote computer can load the instructions into its dynamic memory (RAM) and send the instructions over a telephone line using a modem.

A modem local to computer system 1000 can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer system 1000 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer system 1000, are exemplary forms of carrier waves transporting the information.

Computer system 1000 can send messages and receive data, including program code, through the network(s), network link 1120 and communication interface 1115. In the Internet example, a server 1100 might transmit information retrieved from RDBMS database through Internet 1124, ISP 1126, local network 1122 and communication interface 1115. The instructions for performing the operations of FIG. 1A may be executed by processor 1105 as they are received, and/or stored in storage device 1110, or other non-volatile storage for later execution. In this manner, computer system 1000 may additionally or alternatively obtain instructions and any related data in the form of a carrier wave.

Figure 10A:
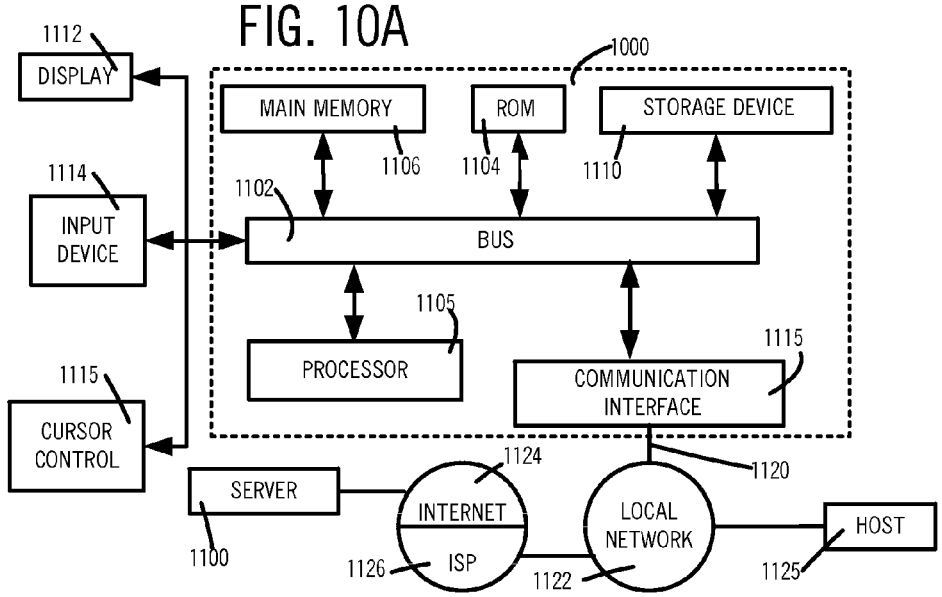
FIGS. 10A and 10B illustrate, in block diagrams, hardware and software portions of a computer that performs the method illustrated in FIGS. 1B and 1C.
Figure 10B:
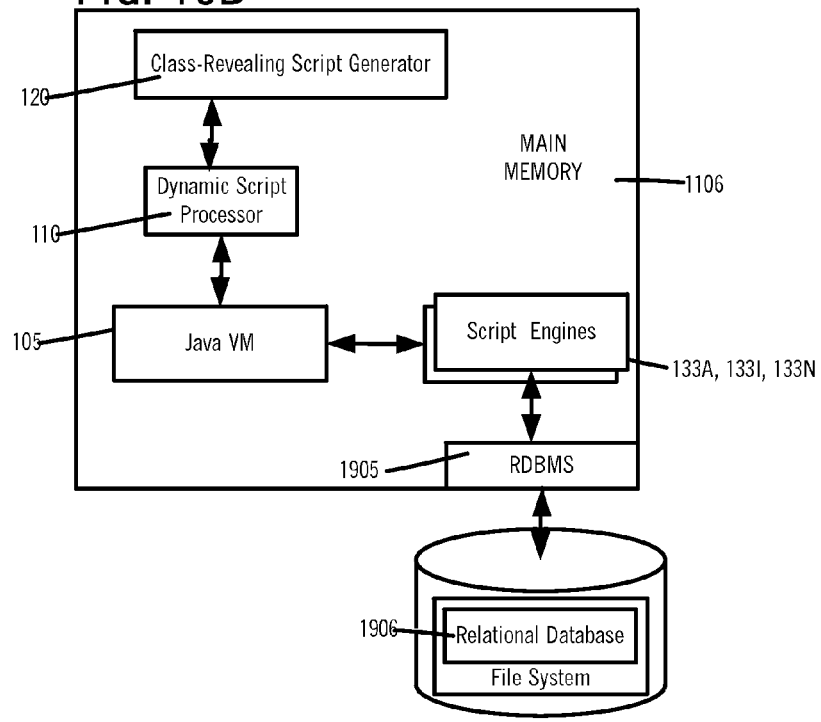

Note that FIG. 10A is a very low-level representation of many hardware components of a computer system. Several embodiments have one or more additional software components in main memory 1106 as shown in FIG. 10B. Specifically, in such embodiments, computer system 1000 of FIG. 10A implements a relational database management system 1905 to manage data in one or more tables (such as table 121 in FIG. 1A) of a relational database 1906 of the type illustrated in FIG. 10B. Such a relational database management system 1905 may manage a distributed database system that includes multiple databases, each table 121 being stored on different storage mechanisms.

In some embodiments, the multiple databases are made to appear to SDA 134 as a single database. In such embodiments, script generator 120 and/or a script processor 110 can access and modify the data in a database 138 via RDBMS 1905 that accepts queries in conformance with a relational database language, the most common of which is the Structured Query Language (SQL). The commands are used by script generator 120 and/or a script processor 110 of some embodiments to store, modify and retrieve data about an application program in the form of rows in a table 121 in relational database 1906. Relational database management system 1905 further includes output logic that makes the data in database table 121 available to a user via a graphical user interface that generates a display on a video monitor 1112. In one example, the output logic of computer 1000 provides results via a web-based user interface that depicts in a browser 107, information related to scripts and classes as illustrated in FIGS. 2A-2Y. Additionally and/or alternatively, screens responsive to a command in a command-line interface and display on a video monitor may be generated in a graphical user interface of the type described above in reference to FIGS. 2A-2Y.

Numerous modifications and adaptations of the embodiments described herein will become apparent to the skilled artisan in view of this disclosure. Numerous modifications and adaptations of the embodiments described herein are encompassed by the scope of the invention.

What is claimed is:

1. One or more non-transitory computer-readable storage media comprising a plurality of instructions, the plurality of instructions comprising:
   instructions to receive a first software written in a first computer language;
   instructions to receive, via a first window, first user input selecting a first name of a first method from among a plurality of methods displayed in the first window and defined in the first software;
   instructions to receive, via a second window displayed with the first window, second user input identifying a location within a second software that is displayed in the second window and written in a second computer language different from the first computer language; and
   instructions to at least one processor to prepare and store at said location, at least a new instruction automatically formatted in a syntax of the second computer language, the new instruction comprising an invocation of the first method identified in the first software by the first name;
   instructions, responsive to receipt of a command to check syntax, to use introspection on the first software to obtain at least a plurality of names identifying the methods defined in the first software and using the plurality of names in checking syntax of the second software; and
   instructions to display a result of checking syntax of the second software.

2. The one or more non-transitory computer-readable storage media of claim 1 wherein:
   the plurality of instructions further comprise instructions to include in the second software, an additional instruction; and
   the additional instruction comprises at least a second name used to invoke execution of the second software, and as a parameter thereof a third name identifying the first software.

3. The one or more non-transitory computer-readable storage media of claim 1 further comprising:
   instructions to display in the first window, a plurality of additional names of variables in the first software;
   instructions to receive via the first window, user input selecting a specific additional name of a variable from among the plurality of additional names; and
   instructions to insert in the second software displayed in the second window, the specific additional name.

4. The one or more non-transitory computer-readable storage media of claim 3 wherein:
   said specific additional name is inserted in the second software displayed in the second window, in another new instruction that invokes a second method in a plurality of methods defined in the first software to (a) retrieve a value or (b) store the value.

5. The one or more non-transitory computer-readable storage media of claim 1 further comprising:
   instructions, responsive to receipt of a command to execute the second software, to instantiate the first software to obtain an instance and invoke a script engine with the instance passed in its entirety as a parameter, to execute the first method of the first name in the first software.

6. The one or more non-transitory computer-readable storage media of claim 1 wherein:
the second computer language is to be interpreted and the second software is a script; and
the first computer language is at least partially compiled and the first software is a program.

7. The one or more non-transitory computer-readable storage media of claim 1 wherein the first window and the second window are comprised in a first screen, and wherein:
the first software has a second name;
the new instruction comprises the second name; and
the plurality of instructions further comprise instructions to receive via a second screen, third user input identifying the second name of the first software.

8. The one or more non-transitory computer-readable storage media of claim 7 further comprising:
instructions, responsive to receipt of user input identifying the second name, to at least check that a class extended in the first software is comprised in a predetermined set of classes.

9. The one or more non-transitory computer-readable storage media of claim 1 wherein:
the new instruction is displayed in the second window at said location and the new instruction comprises a descriptor for an input parameter of the first method;
the plurality of instructions further comprise instructions to replace the descriptor with additional user input, in response to receipt of the additional user input in the second window overwriting the descriptor; and
the descriptor identifies a data type of the input parameter.

10. The one or more non-transitory computer-readable storage media of claim 1 wherein:
a first screen of a graphical user interface is used, by the instructions to receive via the first window, to receive the first user input identifying the first name of the first method;
the first screen of the graphical user interface is used, by the instructions to receive via the second window, to receive the second user input identifying the location within the second software; and
a second screen of the graphical user interface is used to receive third user input identifying a second name of the first software.

11. A method performed in one or more computers, the method comprising:
receiving a first software written in a first computer language;
receiving, via a first window, first user input selecting a first name of a first method from among a plurality of methods displayed in the first window and defined in the first software;
receiving, via a second window displayed with the first window, second user input identifying a location within a second software that is displayed in the second window and written in a second computer language different from the first computer language;
at least one processor preparing and storing at said location, a new instruction automatically formatted in a syntax of the second computer language, the new instruction comprising an invocation of the first method identified in the first software by the first name;
respond to receipt of a command to check syntax, by using introspection on the first software to obtain at least a plurality of names identifying the methods defined in the first software and using the plurality of names in checking syntax of the second software; and
displaying a result of checking syntax of the second software.

12. The method of claim 11 further comprising:
including in the second software, an additional instruction;
wherein the additional instruction comprises at least a second name used to invoke execution of the second software, and as a parameter thereof a third name identifying the first software.

13. The method of claim 11 further comprising:
displaying in the first window, a plurality of additional names of variables in the first software;
receiving via the first window, user input selecting a specific additional name of a variable from among the plurality of additional names; and
inserting in the second software displayed in the second window, the specific additional name.

14. The method of claim 13 wherein:
another instruction in the second software uses a second method in a plurality of methods defined in the first software to (a) retrieve a value or (b) store the value.

15. The method of claim 11 wherein:
the second computer language is to be interpreted and the second software is a script; and
the first computer language is at least partially compiled and the first software is a program.

16. The method of claim 11 further comprising:
responding to receipt of a command to execute the second software, by instantiating the first software to obtain an instance and invoking a script engine with the instance passed in its entirety as a parameter, to execute the first method of the first name in the first software during execution of the second software.

17. The method of claim 16 wherein:
the first software is executed in combination with an initial version of second software prior to preparation and storage of the new instruction; and
the first software is executed unchanged in combination with a current version of second software subsequent to preparation and storage of the new instruction.

18. The method of claim 11 wherein:
the first software has a second name;
the new instruction comprises the second name; and
the method of claim 11 further comprises receiving via a second screen, third user input identifying the second name of the first software.

19. The method of claim 11 further comprising:
responding to receipt of user input identifying a second name, by at least checking that a class extended in the first software is comprised in a predetermined set of classes.

20. The method of claim 11 wherein:
the new instruction is displayed in the second window at said location and the new instruction comprises a descriptor of an input parameter of the first method;
the method of claim 11 further comprises replacing the descriptor with additional user input, in response to receipt of the additional user input in the second window overwriting the descriptor; and
the descriptor identifies a data type of the input parameter.

21. The method of claim 11 wherein:
a first screen of a graphical user interface is used to receive via the first window, the first user input identifying the first name of the first method;

the first screen of the graphical user interface is used to receive via the second window, the second user input identifying the location within the second software; and a second screen of the graphical user interface is used to receive third user input identifying a second name of the first software.

22. An apparatus for preparing software, the apparatus comprising at least one processor coupled to a memory, the memory comprising a plurality of instructions that when executed cause said at least one processor to:

receive a first software written in a first computer language;

receive, via a first window, first user input selecting a first name of a first method from among a plurality of methods displayed in the first window and defined in the first software;

receive, via a second window displayed with the first window, second user input identifying a location within a second software that is displayed in the second window and written in a second computer language different from the first computer language;

prepare and store at said location, a new instruction automatically formatted in a syntax of the second computer language, the new instruction comprising an invocation of the first method identified in the first software by the first name;

respond to receipt of a command to check syntax, by using introspection on the first software to obtain at least a plurality of names identifying the methods defined in the first software and use the plurality of names in checking syntax of the second software; and display a result of checking syntax of the second software.

23. The apparatus of claim 22 wherein:

a first screen of a graphical user interface is used to receive via the first window, the first user input identifying the first name of the first method;

the first screen of the graphical user interface is used to receive via the second window, the second user input identifying the location within the second software; and a second screen of the graphical user interface is used to receive third user input identifying a second name of the first software.

\* \* \* \* \*

UNITED STATES PATENT AND TRADEMARK OFFICE
CERTIFICATE OF CORRECTION

PATENT NO. : 8,966,441 B2  Page 1 of 1
APPLICATION NO. : 13/547641
DATED : February 24, 2015
INVENTOR(S) : Cohanoff It is certified that error appears in the above-identified patent and that said Letters Patent is hereby corrected as shown below:

In the specification

In column 9, line 44, delete "artisan," and insert -- artisan. --, therefor.

In the claims

In column 21, line 36, in Claim 10, delete "used," and insert -- used --, therefor.

In column 21, line 40, in Claim 10, delete "used," and insert -- used --, therefor.

Signed and Sealed this
Thirteenth Day of October, 2015

Michelle K. Lee
*Director of the United States Patent and Trademark Office*